(12) United States Patent
Rouleau et al.

(10) Patent No.: US 10,920,997 B2
(45) Date of Patent: Feb. 16, 2021

(54) INTELLIGENT WATER TANK HEATING MANAGEMENT SYSTEM

(71) Applicant: PowerQ, Montreal (CA)

(72) Inventors: Patrick Reza Rouleau, Montreal (CA); Ezatullah Alokozai, Laval (CA); Richy Duperron, Les Coteaux (CA)

(73) Assignee: PowerQ, Montreal (CA)

( * ) Notice: Subject to any disclaimer, the term of this patent is extended or adjusted under 35 U.S.C. 154(b) by 0 days.

(21) Appl. No.: 16/228,919

(22) Filed: Dec. 21, 2018

(65) Prior Publication Data
US 2020/0200402 A1    Jun. 25, 2020

(51) Int. Cl.
| | | |
|---|---|---|
| F24D 19/10 | (2006.01) | |
| F24D 3/08 | (2006.01) | |
| F24D 17/00 | (2006.01) | |
| G05B 17/02 | (2006.01) | |
| F24H 9/18 | (2006.01) | |
| F24H 9/20 | (2006.01) | |
| F24H 1/20 | (2006.01) | |

(52) U.S. Cl.
CPC ......... *F24D 19/1081* (2013.01); *F24D 3/082* (2013.01); *F24D 17/0031* (2013.01); *F24D 19/1069* (2013.01); *F24H 1/202* (2013.01); *F24H 9/1818* (2013.01); *F24H 9/2021* (2013.01); *G05B 17/02* (2013.01)

(58) Field of Classification Search
CPC ..... F24D 19/1081; F24D 3/082; F24H 9/1818
See application file for complete search history.

(56) References Cited

U.S. PATENT DOCUMENTS

| | | | | |
|---|---|---|---|---|
| 2002/0125241 A1* | 9/2002 | Scott | ....................... | A47J 31/56 219/492 |
| 2005/0000959 A1* | 1/2005 | Kagan | ..................... | H05B 6/04 219/660 |
| 2007/0299562 A1* | 12/2007 | Kates | ........................ | H02J 3/14 700/295 |
| 2010/0085144 A1* | 4/2010 | Aisa | ................... | G05B 19/0423 340/3.1 |
| 2012/0224838 A1* | 9/2012 | Lee | ..................... | F24D 19/1006 392/466 |
| 2019/0285313 A1* | 9/2019 | Nelson | .................. | F24H 9/2021 |
| 2019/0330091 A1* | 10/2019 | Hank | ....................... | E03B 7/04 |

* cited by examiner

*Primary Examiner* — Nathan L Laughlin
(74) *Attorney, Agent, or Firm* — Stratford Managers Corporation

(57) ABSTRACT

A water tank management system that connects either to a hot water tank directly or to an electric panel connected to the tank. The system comprises at least two temperature sensors, each of which is attached on the surface of the hot water tank near respective heating elements. The system comprises a control box which includes a solid-state relay that modulates the flow of electrical power to the heating elements in order to lower the energy used by the tank. The modulation is controlled by a program stored in a memory in the control box or communicated to the control box via an external controller. The system optionally comprises a third temperature sensor placed outdoors to measure the ambient outdoor temperature. With this feature, the system can activate a program to reduce energy consumption when the outdoor ambient temperature is outside a critical temperature range.

20 Claims, 18 Drawing Sheets

INTELLIGENT WATER TANK HEATING MANAGEMENT SYSTEM

TECHNICAL FIELD

The present disclosure is generally related to a water-heating system, and more particularly, to a water-heating system that manages energy consumption for heating water in a water tank.

BACKGROUND

Domestic water heating presents a significant energy burden particularly during on-peak energy periods. Almost every apartment, home and business are connected to a water heater.

Typically, a water tank has a water supply and delivery pipe on top of the tank. A standard water heater tank may include a water storage tank, water inlet and outlet pipes, a manual reset high limit switch, an upper thermostat, a lower thermostat, two heating elements and wires. When power is initially applied to the unit, the upper heating element supplies energy to heat the water in the upper portion of the tank. After the upper portion of the tank is heated to the temperature set on the upper thermostat the power is switched to the lower heating element. The lower heating element continues to heat the water until the water temperature in the lower portion of the tank is heated to the temperature setting on the lower thermostat.

As hot water is drawn from the top of the tank, a dip tube delivers cold water to the bottom of the tank. Eventually the cold water mixes with the heated water in the bottom portion of the tank, lowering the water temperature to below the temperature set on the lower thermostat and the bottom heating element is energized. If enough water is drawn into the tank to cool the upper third of the tank, the upper thermostat will send power to the upper heating element first. When the upper portion of the tank is heated, power will again be switched to the lower element. If the water temperature in the tank reaches a maximum limit, the manual reset high limit switch will be tripped. A reset button above the thermostat can be pushed to reset the high limit switch.

For example, when a consumer draws hot water from the tank for a morning shower or in the evening for an evening shower, the water temperature in the water heater drops. When the thermostat senses that the temperature of the water inside the tank has dropped below the set-point (in the upper and/or lower portion of the water tank), the thermostat sends a signal to one or more of the heating elements to activate.

Current heating systems typically function at 100% power when the system is activated. The power is generally cyclic, activating the heating element at full power (i.e. 100%) for an amount of time until the temperature of the surrounding water attains its set limit Thereafter, the heating element deactivates, until the water temperature drops, after which point, it activates at full (i.e. 100%) power.

The cost of electrical energy often depends on the time of day. Utility companies may divide their rates into off-peak and on-peak energy rates based on the rate of energy consumption throughout the day. Costs for on-peak energy usage may significantly exceed costs for off-peak energy usage. The on-peak energy demand also places a significant burden on the energy-generating facility and creates the need for greater up-keep and maintenance of the energy generating facility and can potentially reduce the overall life of the energy-generating facility.

In addition to statistical mass peak usage during certain hours of the day, hot water consumption may vary throughout the day based on the individual lifestyle of users. For example, the arrival of a new baby, the return of a college student back to his/her parents' home, or someone deciding to work from home, are a few examples that result in increased energy use at a residence. Such lifestyle changes—which add more people to the home and/or increase the amount of time people spend at home—typically increase hot water use.

In other circumstances, hot water consumption may be reduced during the day. For example, when a consumer works the night shift and thus, may not need hot water during the day, or may be content with a lower temperature for hot water. Therefore, managing the power consumption of the water heater by scheduling water heating times based on the lifestyle of the users can improve the efficiency of the water heater and increase the lifespan of the equipment.

U.S. Pat. No. 9,405,304 discloses a water heater and method of operating the same. The water heater comprises a tank for holding water, a heat source, a temperature sensor, a communication module that communicates with an external controller, and a controller that includes a processor and a computer readable memory. The processor causes the controller to control the water heater, while the communication module receives commands from the external controller in order to further operate the water heater.

U.S. Pat. No. 9,057,534 discloses a modular control system and method for water heaters. The system comprises a tank, one or more heating elements mounted on the water heating system, and two controllers that are coupled to activate/deactivate the one or more heating elements.

U.S. Pat. No. 8,761,589 discloses a heated water energy storage system and a method for controlling the same. A utility controls and maintains the temperatures within the storage tank in order to maximize energy storage and minimize energy usage.

U.S. Pat. No. 6,363,216 discloses a water heater having dual side-by-side heating elements for heating water in the tank. The dual side-by-side elements are installed into the lower portion of the tank, and replace two standard pre-installed heating elements, one of which is in the upper portion of the tank, and the second which is in the lower portion of the tank. The water heater includes a proportional band temperature controller that conducts electric power to the heating elements not in a continuous manner, but in intervals. Each interval of electric power is followed by a period during which the temperature controller cuts off power to the heating element. In addition, a separate TRIAC driver is required for each heating element.

Aquanta is a commercial system that provides a retrofittable water heater controller for operation of an electric or gas water heater through a mobile application. The system allows the user to devise a schedule to turn the water on or off.

SUMMARY

In one aspect, there is provided a heating management system for a hot-water tank, the system comprising: a first temperature sensor for measuring a first temperature of water in a first portion of the tank; a second temperature sensor for measuring a second temperature of the water in a second portion of the tank; a controller comprising a processor, a solid state relay and a computer readable memory storing instructions that, when executed by the processor, cause the controller to: compare the first temperature to a first set point; when the first temperature is less than the first set point, control current to a first heating element in the first portion of the tank to operate the first heating element in a first series of pulsed cycles, until the first temperature attains the first set point; after the first temperature attains the first set point, compare the second temperature to a second set point; when the second temperature is less than the second set point, control current to a second heating element in the second portion of the tank to operate the second heating element in a second series of pulsed cycles, until the second temperature attains the second set point; and maintain the first and second temperatures at the respective set points by controlling current to the respective heating elements such that the first and second heating elements operate sequentially in pulsed cycles; wherein each pulsed cycle consists of a pulse interval and a cycle interval and has a power efficiency (PE) defined as:

PE=(pulse interval)/(cycle interval);

the power efficiency of each of the pulsed cycles decreases with increasing water temperature; and the cycle interval of each pulsed cycle increases with increasing water temperature.

In some embodiments, the system may further comprise a radio frequency transmitter, wherein the radio frequency transmitter is attached to either the first or second heating element.

In some embodiments, the system may further comprise a first and second radio frequency transmitter, wherein the first radio frequency transmitter is attached to the first heating element; and the second radio frequency transmitter is attached to the second heating element. At least one of the first and second heating elements can vibrate at a frequency of between 15 GHz and 30 GHz.

In some embodiments, the power efficiency of each pulsed cycle can be between 20%-90%; between 30%-90%; or between 30%-80%.

In some embodiments, when a difference between the first temperature and the first set temperature is greater than 15° C., the power efficiency of the first series of pulsed cycles can be between 70%-90%; and when a difference between the second temperature and the second set temperature is greater than 15° C., the power efficiency of the second series of pulsed cycles can be between 70%-90%.

In some embodiments, when a difference between the first temperature and the first set temperature is less than 15° C., the power efficiency of the first series of pulsed cycles can be between 20%-70%; and when a difference between the second temperature and the second set temperature is less than 15° C., the power efficiency of the second series of pulsed cycles can be between 20%-70%.

In some embodiments, the first cycle interval can be between 7 sec-13 sec; between 8 sec-12 sec; or can bell) sec; and the second cycle interval can be between 7 sec-13 sec; between 8 sec-12 sec; or can be 10 sec.

In some embodiments, the system may further comprise a third temperature sensor for measuring an ambient outdoor temperature which is communicated to the controller, wherein the instructions stored on the memory, when executed by the processor, cause the controller to shut off each heating element when the outdoor ambient temperature is outside a critical temperature range.

In some embodiments, the system may further comprise a communication module operable to communicate with an external controller remote from the water heater, wherein the instructions stored on the memory, when executed by the processor, cause the controller to receive a command for operation of the first and second heating elements from the external controller when an outdoor ambient temperature is outside a critical temperature range.

In some embodiments, the critical temperature range can be between about minus (-) 15° C. and about +27° C.; preferably between -12° C. and about +25° C.

In some embodiments, the system may further comprise a UV sanitization unit that comprises: a pump external to the tank; a first tube through which water is pumped out of the tank the external tank; a UV portion through which the pumped water passes and is disinfected; and a second tube through which the disinfected water is returned to the tank.

In another aspect, there is provided a heating management system for a hot-water tank, the system comprising: a first temperature sensor for measuring a first temperature of water in a first portion of the tank; a second temperature sensor for measuring a second temperature of the water in a second portion of the tank; a radio frequency transmitter, wherein the radio frequency transmitter is attached to either the first or second heating element; a UV sanitization unit; a third temperature sensor for measuring an ambient outdoor temperature; and a controller comprising a processor, a solid state relay and a computer readable memory storing instructions that, when executed by the processor, cause the controller to: shut off each heating element when the outdoor ambient temperature is outside a critical temperature range; and when the outdoor ambient temperature is within the critical temperature range; compare the first temperature to a first set point; when the first temperature is less than the first set point, control current to a first heating element in the first portion of the tank to operate the first heating element in a first series of pulsed cycles, until the first temperature attains the first set point; after the first temperature attains the first set point, compare the second temperature to a second set point; when the second temperature is less than the second set point, control current to a second heating element in the second portion of the tank to operate the second heating element in a second series of pulsed cycles, until the second temperature attains the second set point; and maintain the first and second temperatures at the respective set points by controlling current to the respective heating elements such that the first and second heating elements operate sequentially in pulsed cycles; wherein each pulsed cycle consists of a pulse interval and a cycle interval and has a power efficiency (PE) defined as:

PE=(pulse interval)/(cycle interval);

the power efficiency of each of the pulsed cycles decreases with increasing water temperature; and the cycle interval of each pulsed cycle increases with increasing water temperature.

In some embodiments, the system may further comprise a first and second radio frequency transmitter, wherein the first radio frequency transmitter is attached to the first heating element; and the second radio frequency transmitter is attached to the second heating element. At least one of the first and second heating elements can vibrate at a frequency of between 15 GHz and 30 GHz.

In some embodiments the UV sanitization unit may comprise: a pump external to the tank; a first tube through which water is pumped out of the tank the external tank; a UV portion through which the pumped water passes and is disinfected; and a second tube through which the disinfected water is returned to the tank.

In some embodiments, when a difference between the first temperature and the first set temperature is greater than 15° C., the power efficiency of the first series of pulsed cycles can be between 70%-90%; and when a difference between the second temperature and the second set temperature is greater than 15° C., the power efficiency of the second series of pulsed cycles can be between 70%-90%.

In some embodiments, when a difference between the first temperature and the first set temperature is less than 15° C., the power efficiency of the first series of pulsed cycles can be between 20%-70%; and when a difference between the second temperature and the second set temperature is less than 15° C., the power efficiency of the second series of pulsed cycles is between 20%-70%.

Some of the shortcomings of the prior art may be overcome and additional advantages may be provided through the use of a system that allows a utility company to allocate the energy required to heat water in a hot water tank based on on-peak and off-peak energy demands and/or based on a threshold outdoor ambient temperature tank. The utility company can use the outside ambient temperature as a threshold when allocating the energy demands to heat a hot water tank. The utility company can also apportion the energy demands required to heat a hot water tank using demand data from off-peak and on-peak energy demands.

The heat management system thus provides for the minimization of electricity consumption in an electrical grid at times of high demand, by allowing utility companies to redistribute electricity efficiently.

Additional features and advantages are realized through the techniques of the present invention. Other embodiments and aspects of the invention are described in detail herein and are considered a part of the claimed invention.

The recitation herein of desirable embodiments is not meant to imply or suggest that any or all of these embodiments are present as essential features, either individually or collectively, in the most general embodiment of the present invention or in any of its more specific embodiments.

BRIEF DESCRIPTION OF THE DRAWINGS

The foregoing and other advantages of the disclosure will become apparent upon reading the following detailed description and upon reference to the drawings.

Figure 1A:
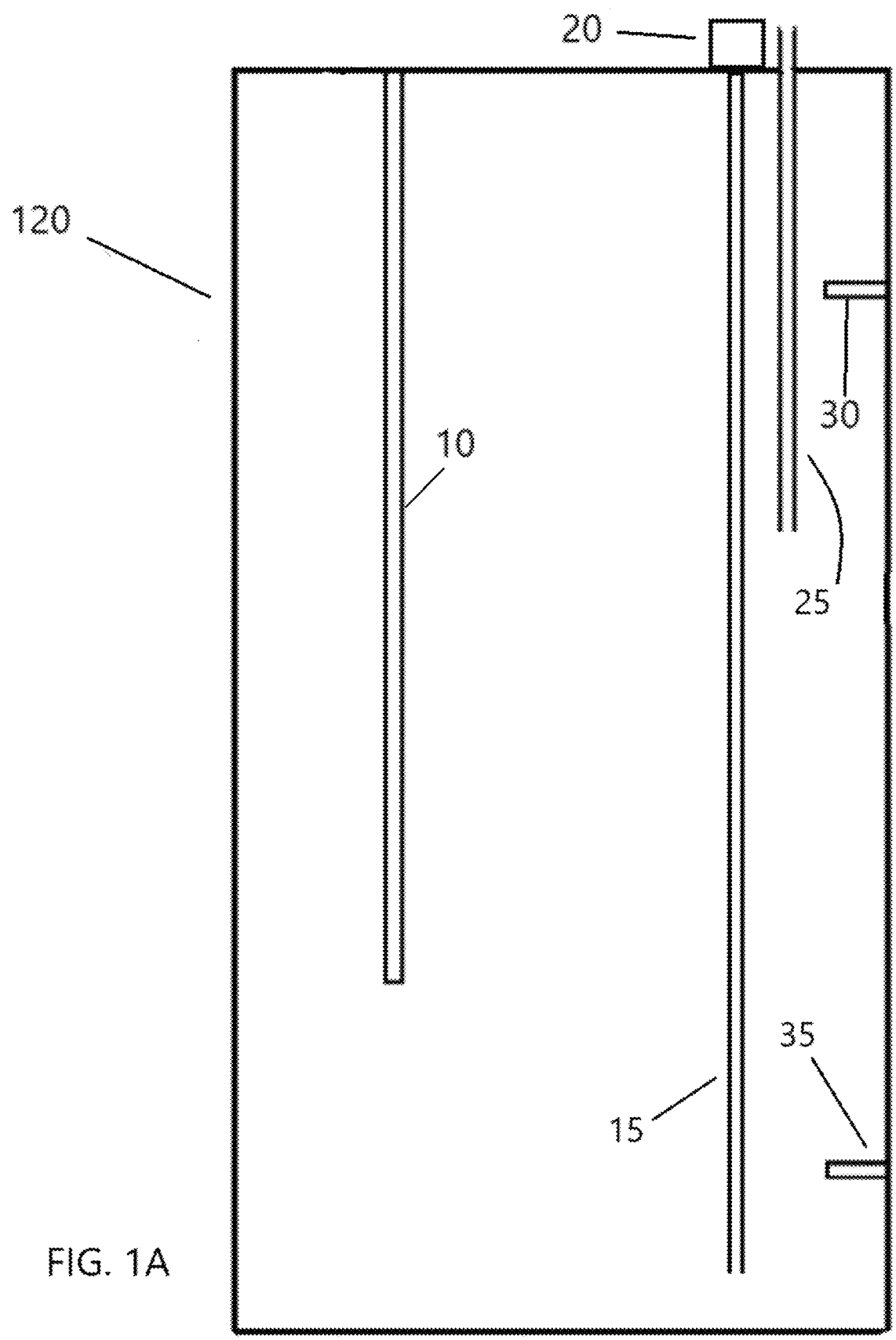
FIG. 1A illustrates cut-away of a hot-water tank configuration.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1A illustrates cut-away of a configuration of a standard hot-water tank 120. It is understood that other configurations are possible for a standard hot-water tank 120. An anode 10 extends into the water tank 120; a dip tube 15 extends into the water tank 120 from a water inlet 20; and a water outlet 25 is provided for the outlet of hot water. The anode 10, dip tube 15 and water outlet 25 can each have an entry point at the top of the water tank 120. The dip tube 15 allows for the addition of cold water near the bottom portion of the water tank 120. The water outlet 25 allows for the withdrawal of hot water from the top portion of the water tank 120.

In FIG. 1A, two heating elements 30, 35 extend into the water tank 120; one heating element. 30, extends into an upper portion of the water tank 120, while the other heating element, 35, extends into a lower portion of the water tank 120. It is understood that more than two heating elements can be used to heat water inside the tank 120, with each heating element extending into a different portion of the water tank 120. As discussed below, each heating element may be subjected to pulsed heating, as well as vibration (via, for example, a radio-frequency transmitter attached to the heating element).

First Embodiment

Figure 1B:
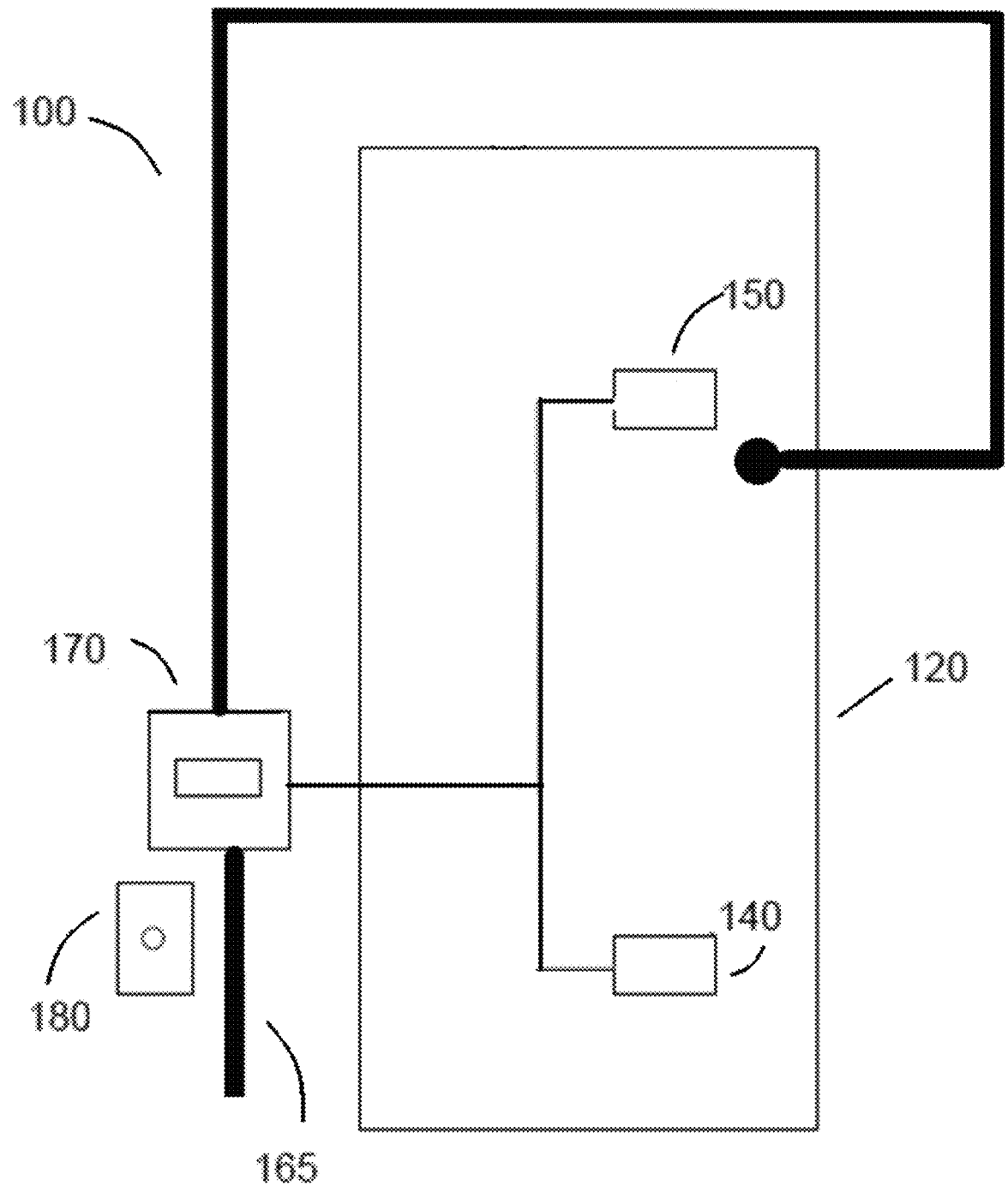
FIG. 1B illustrates a first embodiment of the water heating system.

Referring to FIG. 1B, a water tank heating system 100 is shown, in accordance with an embodiment of the present invention. It includes a thermal sensor 140 on a lower side of the water tank 120, a thermal sensor 150 on an upper side of the water tank 120, a control box 170 and a remote indicator 180. External power supply 165 is supplied through the control box 170 and subsequently to the water tank 120. While FIGS. 1A and 1B illustrate an exemplary electrical storage-type water tank 120, some embodiments may include a gas storage-type water heater. The thermal sensors 140 and 150 can measure temperature at least in the range of negative 55° C. to positive 125° C. with an accuracy of (+/−) 0.5° C. Other measuring instruments can be used as known in the art.

The power supply 165 can be provided by, for example, a public electric utility or a natural gas utility; the power is often distributed by the utility through an electrical power grid or a gas distribution system. The water tank 120 may be located, for example, in a residence, a public building, a business, or the like.

While this embodiment refers to multiple heating elements, it is contemplated that the water tank heating system 100 may also use a gas burner as a source for heating the water in the water tank 120, or a combination of a gas burner and one or more electric heating elements. As such, while the description below refers to multiple heating elements, it is understood that the system 100 can operate using a gas burner as a heat source, or a combination of a gas burner and one or more heating elements as the heat source.

The temperature sensors 140 and 150, shown on the outside of the water tank 120; each provide a temperature reading of a region of the water in water tank 120. In addition, each sensor is connected to the control box 170. A communication link may be used to establish communication and control among the sensors 140 and 150 with the control box 170.

Heating elements are controlled, in part, by a solid-state relay (see FIG. 2) that receives control signals. The control box 170 can control the heating elements in the water tank 120 by providing a control signal to the solid-state relay. The control box 170 circuitry can take the form of a programmable device as discussed further below. It is envisioned that more than two temperature sensors may be installed as part of the water tank management system 100, as discussed below. Regardless of the exact control circuitry used, the heating elements in the water tank 120 are individually controlled. In addition, the temperature sensors 140 and 150 may be used as part of one or more feedback mechanisms that activate the (pulsing) operation of the heating elements, and optionally, vibration of each heating element.

The remote indicator 180 indicates to a user that the heat management system is in use. For example, it may notify the user that a utility company protocol is in use. Or, it may notify the user to lower use of electricity during on-peak hours.

Figure 2:
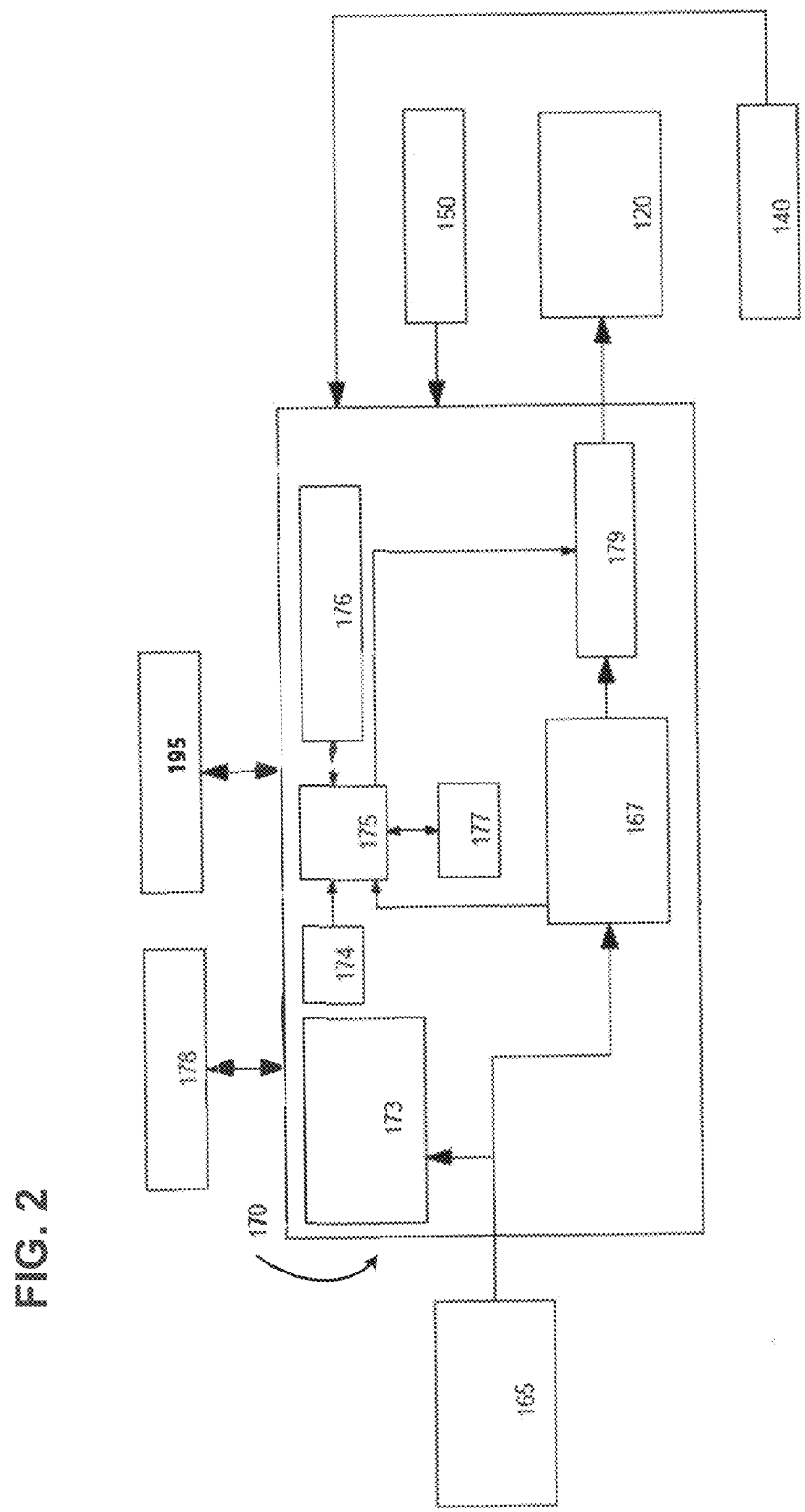
FIG. 2 illustrates a schematic representation of a control box in relation to the first embodiment shown in FIG. 1B.

FIG. 2 provides a schematic representation of the embodiment of the heat management system shown in FIG. 1B. Electrical power supply 165 is produced by the utility company and supplied to the control box 170. The electrical power can have nominal line voltages between 110V to 120V and 220V to 240V AC and frequencies of approximately 50-60 Hertz (Hz). In addition, control box 170 is connected to an external communication module 195, a user interface 178, and temperature sensors 140 and 150. The control box 170 may be connected to other elements such as an anode, a pump, a disinfection unit, and other elements known in the art.

The control box 170 receives and AC current from electric power line 165, and modulates the power supplied to the heating elements, sequentially, inside the water tank 120 via the solid-state relay 179. The control box 170 also receives first and second temperature signals from the first and second temperature sensors 140 and 150, respectively in order to control the heating elements within the water tank 120. Furthermore, the control box 170 receives information and commands from a user via the user interface 178 and/or an external controller via the communication module 195. These instructions may include, for example, the rate of modulation, the temperature set points of the heating elements, a vibration frequency of the heating elements, and the schedule of heating. Examples of instructions are given below.

The user interface 178 allows the user to effectively operate and control the water tank 120 directly from the user end. The user interface 178 may include a touch-screen display of set points of the water tank 120 as well as being able to accommodate a combination of digital and analog input devices. For example, the user interface 178 may include an electronic-based device having a display, a touch-screen display, a plurality of knobs, dials, switches, buttons, faders, or the like.

As an example, the external controller can be a house controller, a grid controller or a utility company controller. An exemplary communication module is a USNAP compatible device providing a demand response (DR) or home area network (HAN) solution for the water tank 120.

The control box 170 includes both hardware and software. For example, the control box 170 may include a printed circuit board (PCB) that includes several electrical/electronic components, to provide power, operation control and protection to the water tank 120. In some instances, the PCB may include, for example a processing unit (e.g., a microprocessor, a microcontroller, or another suitable programmable device or combination of programmable devices), a memory and a bus.

In the embodiment shown in FIG. 2, a microcontroller 175 is used. The microcontroller unit 175 is connected to memory 177 and may be a small computer on a single integrated circuit. The bus (not shown) allows for the connection of various components to the microcontroller unit 175. Additionally, or alternatively, the memory 177 may be included in the microcontroller unit 175.

In the embodiment shown in FIG. 2, two processors are used. Nonetheless, any number of processors can be used. In FIG. 2, one processor interacts with communications external to the control box. As an example, this may include communication with an energy consumer's Bluetooth device via the external communication module 195. It may also include communication with an external controller (not shown), via the communication module 195. For example, the external controller can send commands and command information to the control box 170.

The control box 170 therefore, may receive commands and command information from a user via the user interface 178 or the external controller (via the communication module 195), and any combination thereof.

A second processor of microcontroller unit 175 contains the main program along with the peripherals; this processor communicates with the other modules such as the real-time clock integrated chip 174, the temperature sensors 140 and 150, etc.

In the embodiment shown in FIG. 2, the control box 170 includes various other components, such as a memory 177, a power supply 173, a real-time clock 174, internal communication modules 176, a current transformer 167 and a solid-state relay 179, each of which are further described below.

The memory 177 may include, for example, a read-only memory ("ROM"), a random-access memory ("RAM"), an electrically erasable programmable read-only memory ("EEPROM"), Ferroelectric RAM integrated chips (FRAM), a flash memory, a hard disk, or another suitable magnetic, optical, physical, or electronic memory device typically used for this application. The memory 177 can be a non-volatile memory which holds basic information about the current configuration such as calendar or factory settings.

Software code (for the execution of a program to operate the water tank 120) is stored in memory 177. The software includes, for example, firmware, one or more applications, program data, one or more program modules, and other executable instructions.

The control box 170 is configured to retrieve from memory and execute instructions related to the control processes and methods described herein. Software may be stored in the RAM, the ROM, or any other non-transitory computer readable medium (e.g. a disc or another memory). As an example, the control box 170 is designed to execute instructions that are retrieved from the memory 177. These instructions control the heating elements (in the water tank 120) so that the water is heated to one or more set points based on readings of the temperature sensors 140 and 150. The instructions may be further based on one or more commands and information from the user interface 178 and/or external communication module 195.

The internal communication modules 176 provide routines for the transfer of information between the various components within the control box 170, as well as between the various internal components and external components. For example, the internal communication modules 176 may communicate with the external communication module 195, the user interface 178 and the temperature sensors 140 and 150. Furthermore, the internal communications modules 176 facilitate the exchange of information between the microcontroller 175 and the other modules when the main protocol used by some peripherals is not supported by the microcontroller 175.

The power supply 173 converts alternating current (AC) from the electric power 165 into direct current (DC) and supplies the internal hardware components of the control box 170 with power.

The current transformer 167 produces an alternating current in its secondary winding which is proportional to the current being measured in its primary conductor. The secondary current is then suitable for processing by the microcontroller 175.

The control box 170 is electrically connected to the upper and lower water temperature sensors 140 and 150, as well as to the upper and lower heating elements. In addition, the control box 170 operates the first and second heating elements in a controlled manner via the solid-state relay 179. Moreover, feedback mechanisms that employ the temperature sensors 140 and 150 may be used as part of one or more feedback mechanisms that activate the (pulsing) operation of the heating elements, in addition to vibration of each heating element. That is, the control box 170 also receives first and second temperature signals from the first and second temperature sensors 140 and 150, respectively, to control the heating elements. The temperature sensors 140 and 150 feedback temperature measurements to the microcontroller 175 using a digital communications protocol.

A real-time clock integrated chip (RTC) 174, for example, keeps track of the time and date. The RTC clock 174 can be powered by an independent battery known in the art (for example, but not exclusively, a cell button battery).

A solid-state relay 179, described above, allows for the sequential modulation of the water heating elements in the water heater and switches on or off when a small external voltage is applied across its control terminals. Depending on the heat-management protocol, the solid-state relay 179 allows for the sequential pulsing of each heating element, until a set-point temperature for each heating element is attained.

The control box 170 may also include several other passive and active components, such as inductors, resistors, capacitors, converters, integrated circuits and amplifiers. These components are connected and arranged to provide additional electrical functions to the control box 170, including for example, voltage regulation, signal converting and/or signal conditioning, filtering.

In general terms, the sensors measure the electrical current and temperatures at regular intervals, for example, every 100 ms. That is, the current transformer measures the electrical current of the power line to the water tank 120, while the temperature sensors measure the internal temperature of the lower and upper parts of the water tank 120. The real time clock (RTC) 174 provides the time for each data measurement. All data can be saved into the memory 177 or sent via the external communication module 195 to a remote server (i.e. a cloud) for storage and analysis.

The communication module 195 receives the heating schedule of water tank 120 from an end user or a real-time command from a utility company and saves the schedule/command into memory 177. Examples thereof are provided below.

Second Embodiment

Figure 3:
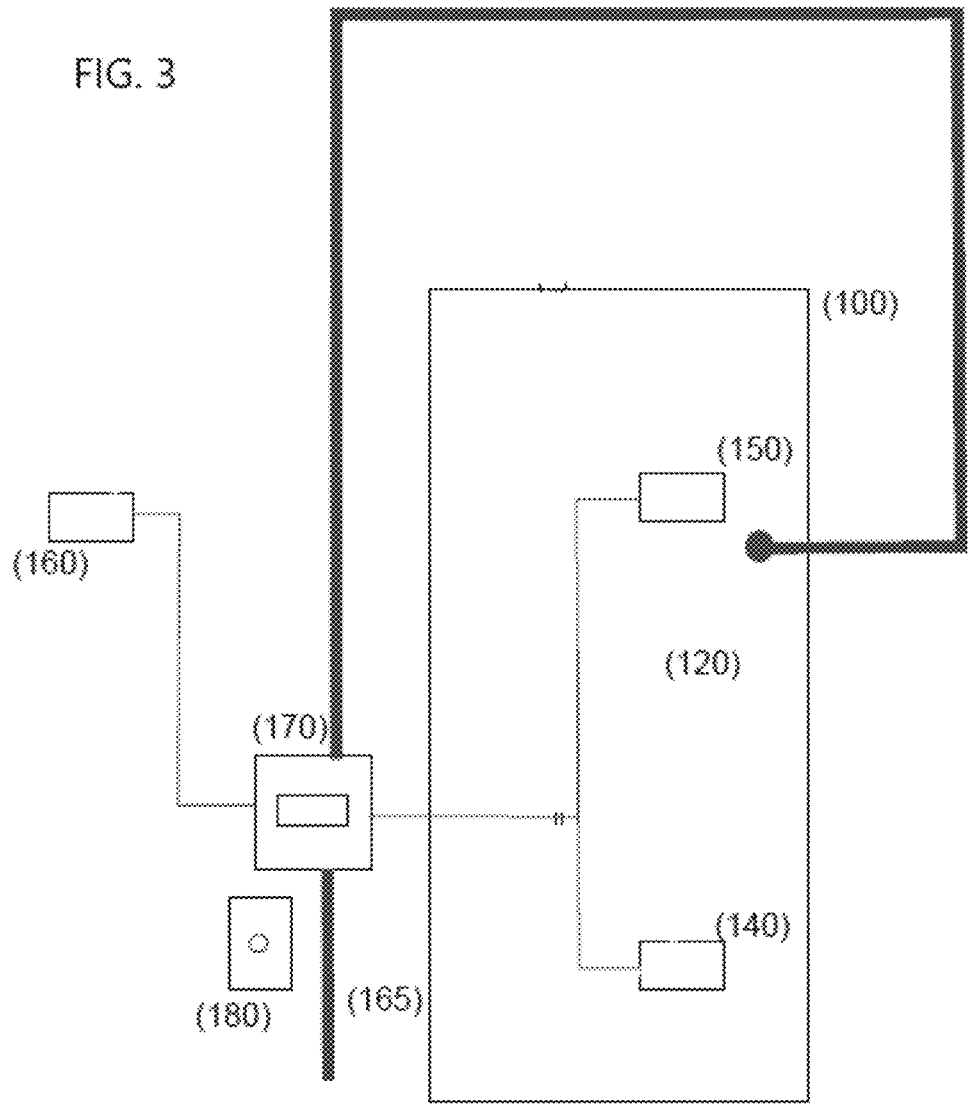
FIG. 3 illustrates a second embodiment of the water heating system.

A second embodiment of the heat management system incorporates a third temperature sensor 160 located outside the building (that contains the water tank) that measures the ambient outdoor temperature, as shown in FIG. 3. The temperature reading from temperature sensor 160 can be used for a heat management protocol when the ambient outdoor temperature is either below a first critical temperature, or above a second critical temperature. For example, the first critical temperature can be minus 10° C., minus 12° C., or minus 15° C., an exemplary second critical temperature can be 25° C., 27° C., or 30° C., the remaining components of the heat management system shown in FIG. 3 are identical to those shown in FIG. 1, and thus retain the original reference numbers. Like thermal sensors 140 and 150, thermal sensor 160 can measure temperature at least in the range of negative 55 deg. Celsius (° C.) to positive 125° C. with an accuracy of (+/−) 0.5° C. Other measuring instruments can be used as known in the art.

Figure 4:
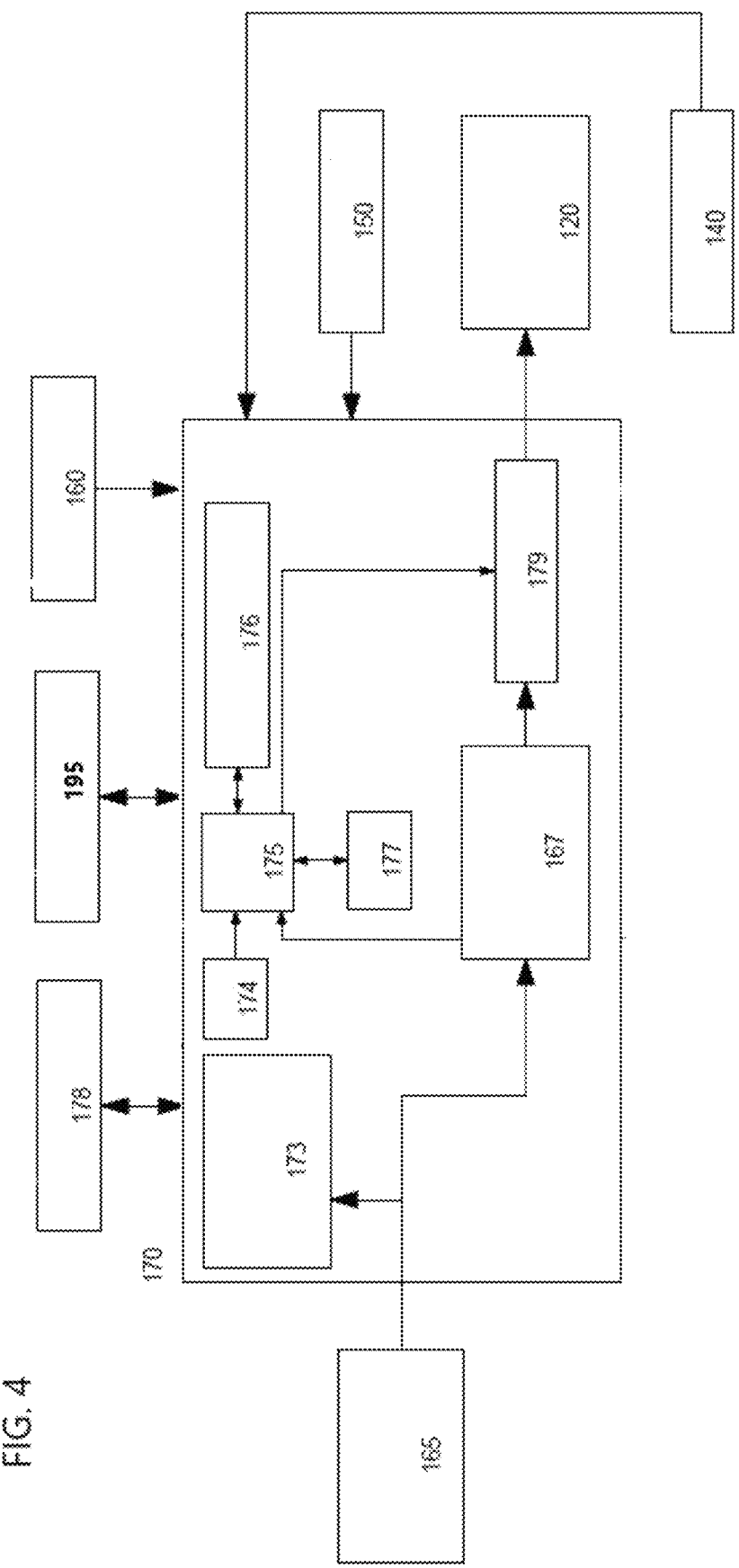
FIG. 4 illustrates a schematic representation of a control box in relation to the second embodiment.

FIG. 4 provides a schematic representation of the embodiment of the heat management system shown in FIG. 3. The components of the heat management system shown in FIG. 4 are identical to those shown in FIG. 2, and thus retain the original reference numbers. In addition to temperature sensors 140 and 150, control box 170 is connected to temperature sensor 160. The second processor of microcontroller unit 175 communicates as well with temperature sensor 160. Finally, temperature sensors 140, 150 and 160 feedback temperature measurements to the microcontroller 175 using a digital communications protocol.

The temperature reading from temperature sensor 160 can be used for a heat management protocol when the ambient outdoor temperature is either below a first critical temperature, or above a second critical temperature. For example, the first critical temperature can be anywhere within a range of (−)15° C. to (−) 10° C. For example, the first critical temperature may be minus 15° C., minus 14° C., minus 13° C., minus 12° C., minus 11° C. or minus 10° C. An exemplary second critical temperature can be anywhere in a range of 25° C. to 30° C. For example, the second critical temperature may be 25° C., 26° C., 27° C., 28° C., 29° C. or 30° C., Examples of heat management protocols when the ambient outdoor temperature is either below the first critical temperature or above the second critical temperature, are discussed below.

Third Embodiment

Figure 5:
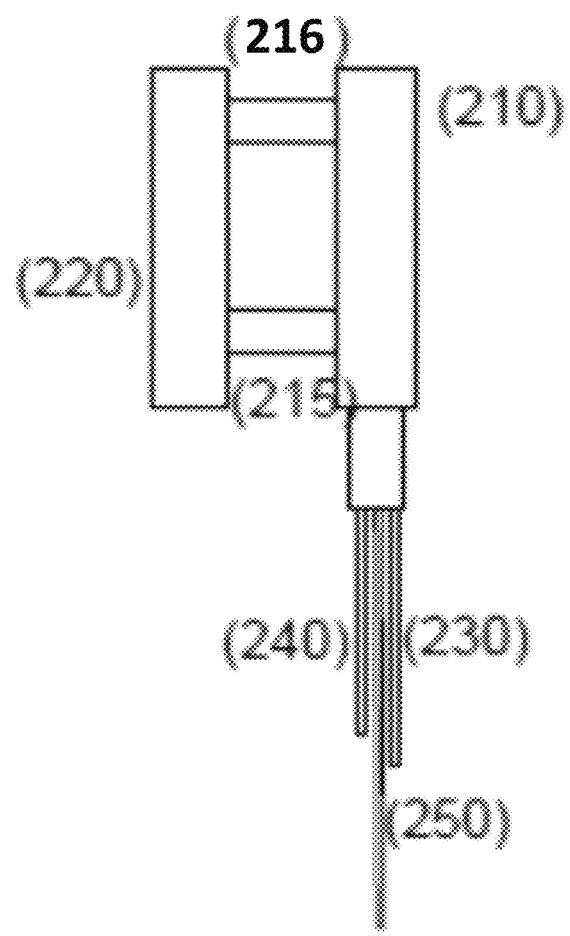
FIG. 5 illustrates an exemplary UV disinfection unit for use in a third embodiment of the water heating system.

A third embodiment of the heat management system incorporates a UV-disinfection system to disinfect water in the water tank 120. An example of a UV disinfection unit 200 is shown in FIG. 5, which comprises a micro-centrifugal pump 210, upper valve 216, lower valve 215, a tube with UV lighting 220, a titanium anode 230, an outlet pipe 240, and an inlet pipe 250.

Figure 6:
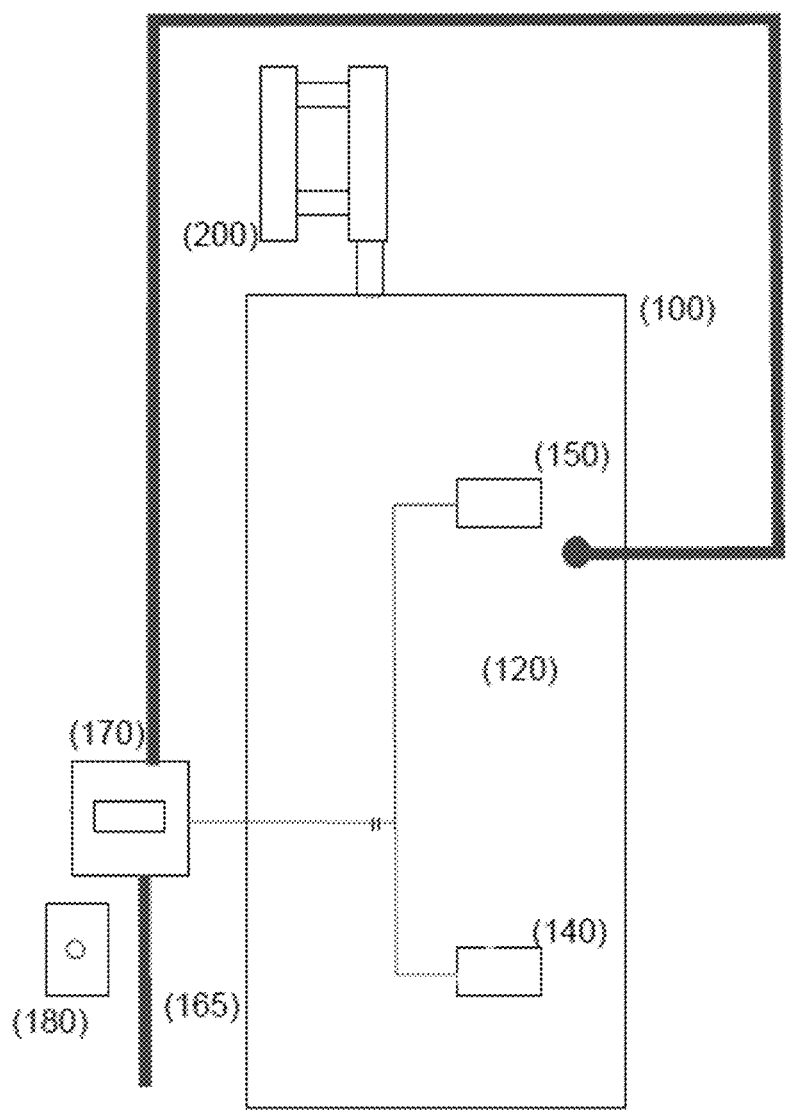
FIG. 6 illustrates a third embodiment of the water heating system.

The UV-disinfection system is installed through the top of the water tank 120, as shown in FIG. 6, in place of the anode 10 shown in FIG. 1A. Since the remaining components are identical to those shown in FIG. 1B, identical reference numbers are retained. The titanium anode 230 (shown in FIG. 5) replaces the standard anode 10 (shown in FIG. 1A) that is usually pre-installed in the water tank 120. The titanium anode may be powered at 24 volts DC from control unit 170.

The micro-centrifugal pump 210 draws water through the inlet pipe 250 from the water tank 120. The drawn water passes through the upper valve 216, then through the UV light-filled tube 220 where it is disinfected, then through the lower valve 215, then back to the water tank 120 through outlet pipe 240.

A standard micro-centrifugal pump 210 can pump about 6.5 liters/minute; as such, all the water in a standard hot-water tank can be pumped in about an hour. For example, a 100-gallon tank (equivalent to 380 liters) will require about 60 minutes). The UV-disinfection system can run at least once a day if the temperature in the water tank is conducive to bacteria propagation.

Figure 7:
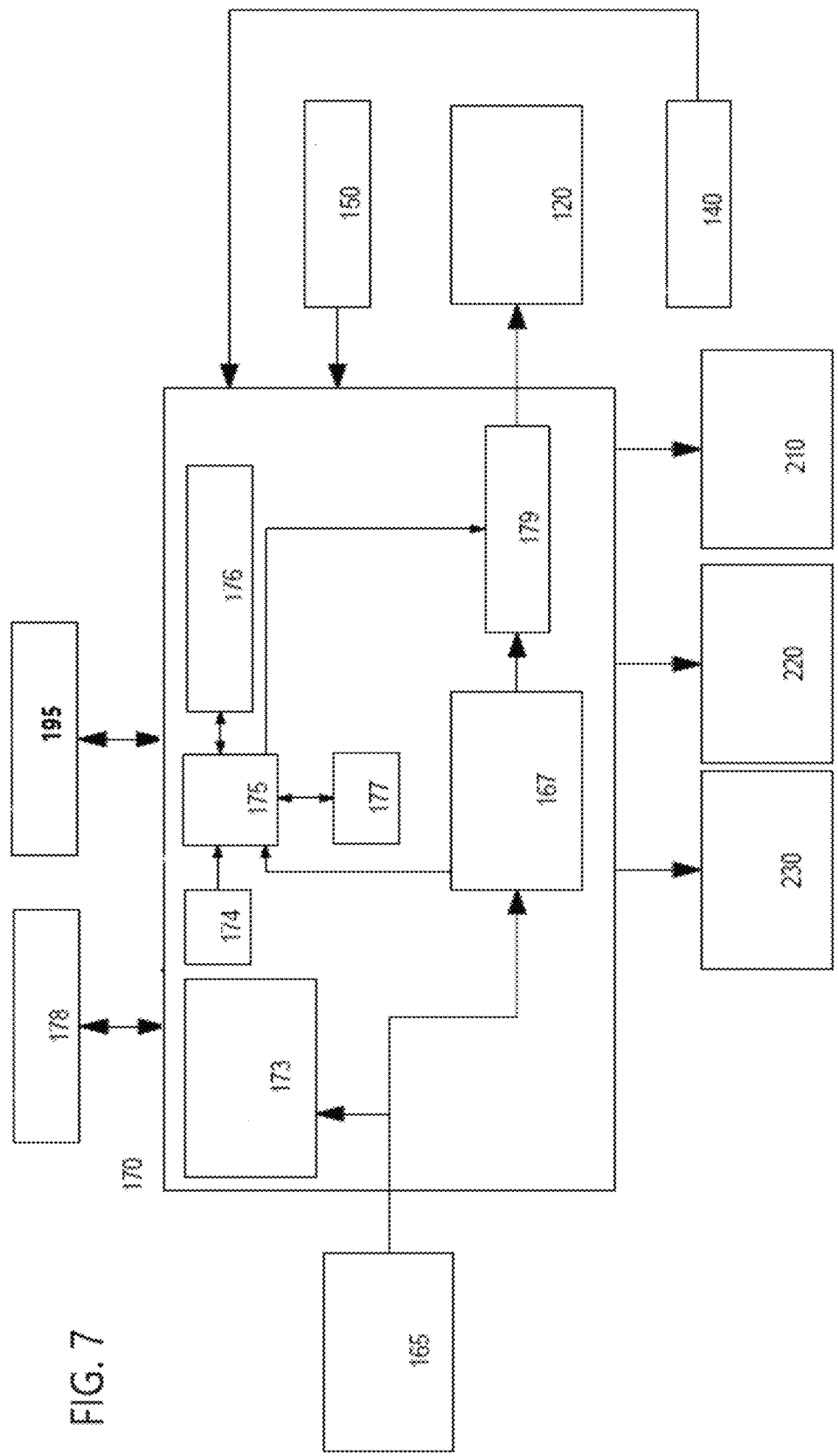
FIG. 7 illustrates a schematic representation of a control box in relation to the third embodiment.

FIG. 7 provides a schematic representation of the embodiment of the heat management system shown in FIG. 6. The components of the heat management system shown in FIG. 7 are identical to those shown in FIG. 2, and thus retain the original reference numbers. In addition, control box 170 is connected to the titanium anode 230, the UV light tube 220 and the micro-centrifugal pump 210.

Fourth Embodiment

A fourth embodiment of the heat management system incorporates both a third temperature for measuring the ambient outdoor temperature (as shown in the second embodiment) and a UV-disinfection system (as shown in the third embodiment).

Figure 8:
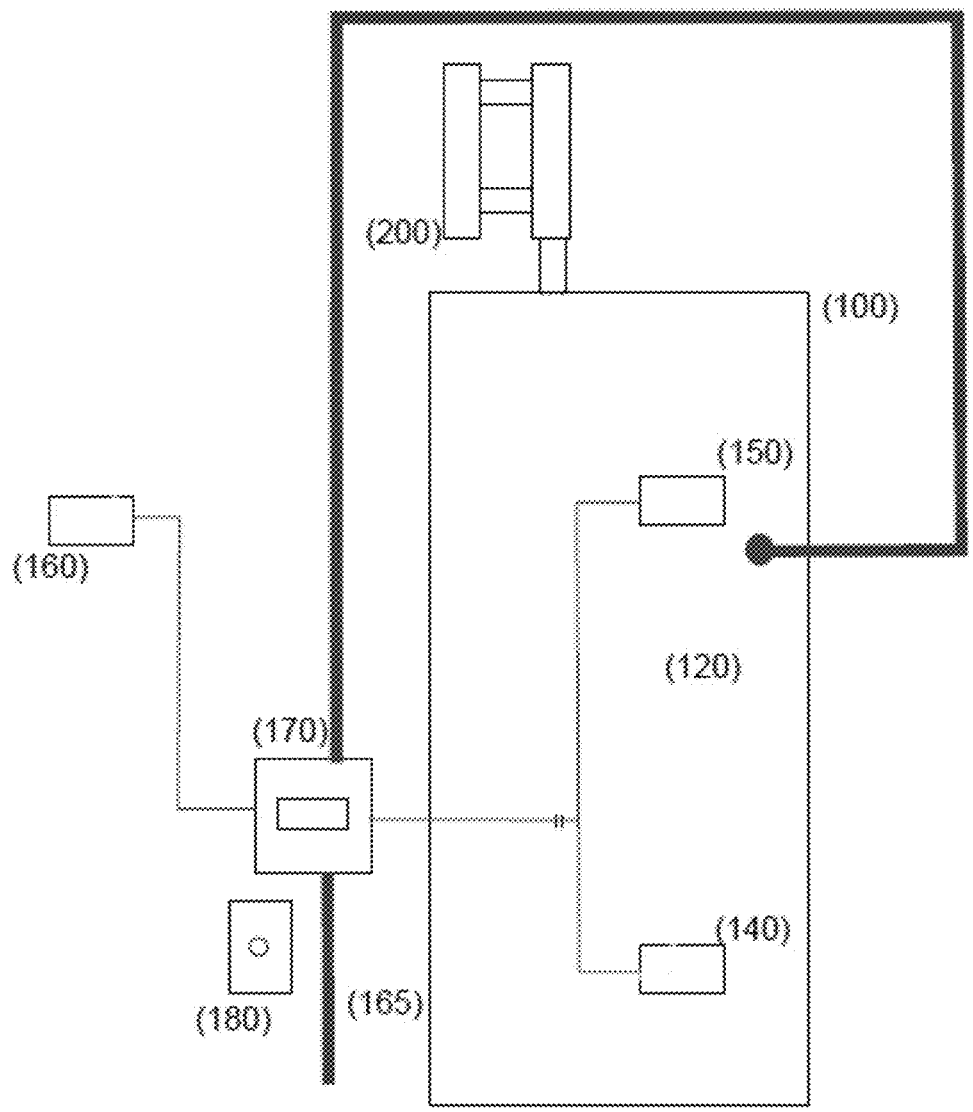
FIG. 8 illustrates a fourth embodiment of the water heating system.

FIG. 8 shows. a fourth embodiment of the heat management system 100, in which the UV-disinfection system 200 is installed through the top of the water tank 120 (as shown in FIG. 6), and the third temperature sensor 160 is installed outside the building (as shown in FIG. 3). Since the remaining components are identical to those shown in FIG. 1B, identical reference numbers are retained.

Figure 9:
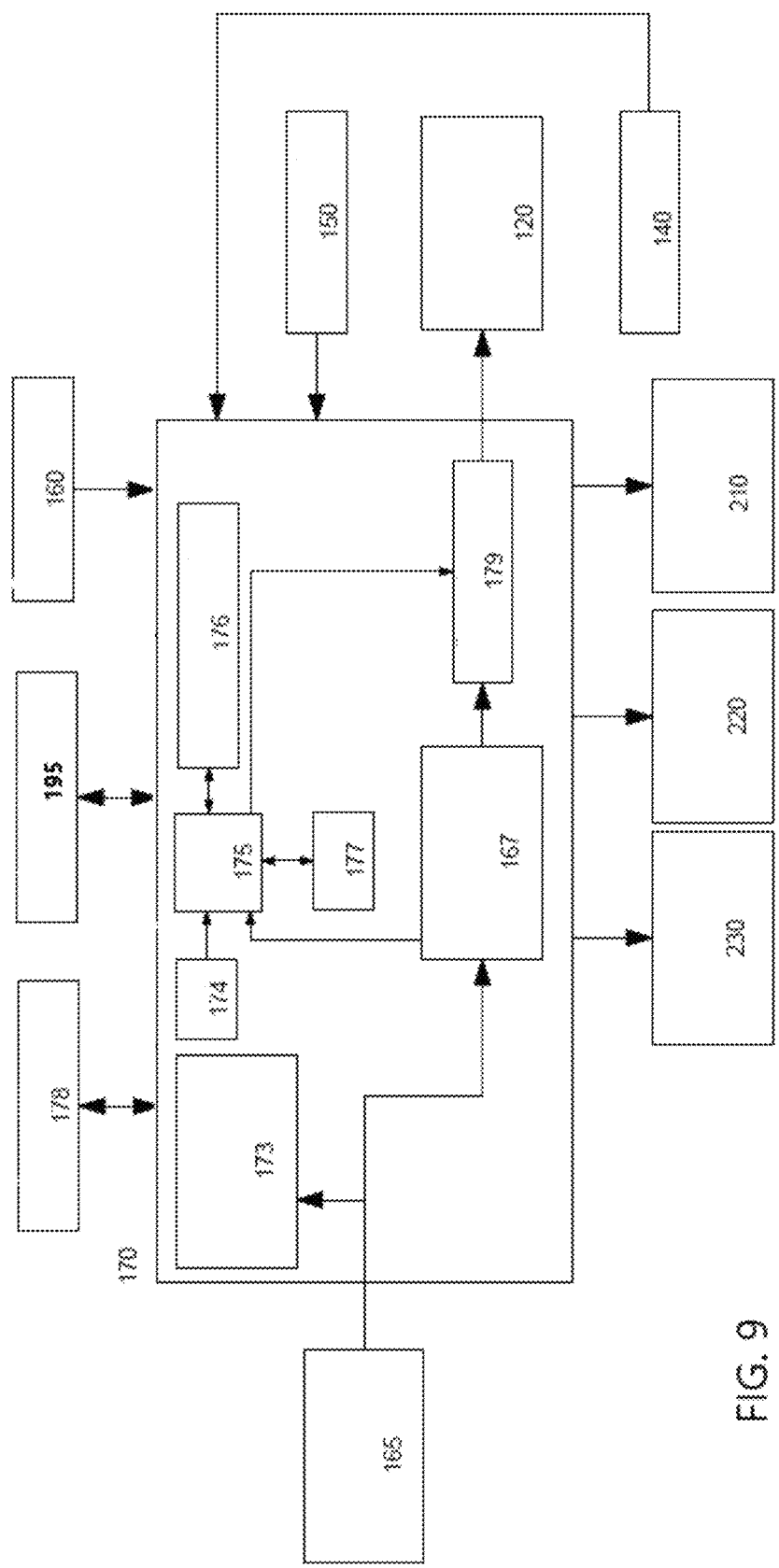
FIG. 9 illustrates a schematic representation of a control box in relation to the fourth embodiment.

FIG. 9 provides a schematic representation of the embodiment of the heat management system shown in FIG. 8. The components of the heat management system shown in FIG. 7 are identical to those shown in FIG. 2, and thus retain the original reference numbers. In addition, control box 170 is connected to the titanium anode 230, the UV light tube 220, the micro-centrifugal pump 210 and the third temperature sensor 160.

Pulsing Cycle

As described above, the solid-state relay 179 allows for the sequential pulsing of each heating element, until a set-point temperature for each heating element is attained. Unlike conventional heating protocols in which a heating element is operated continuously at 100% power until a set-point temperature is attained, sequential pulsing applies power to a heating element in pulses.

Pulsing is based, in part, on the interplay between the thermal inertia of the heating element and the temperature of the water in the tank.

Figure 10A:
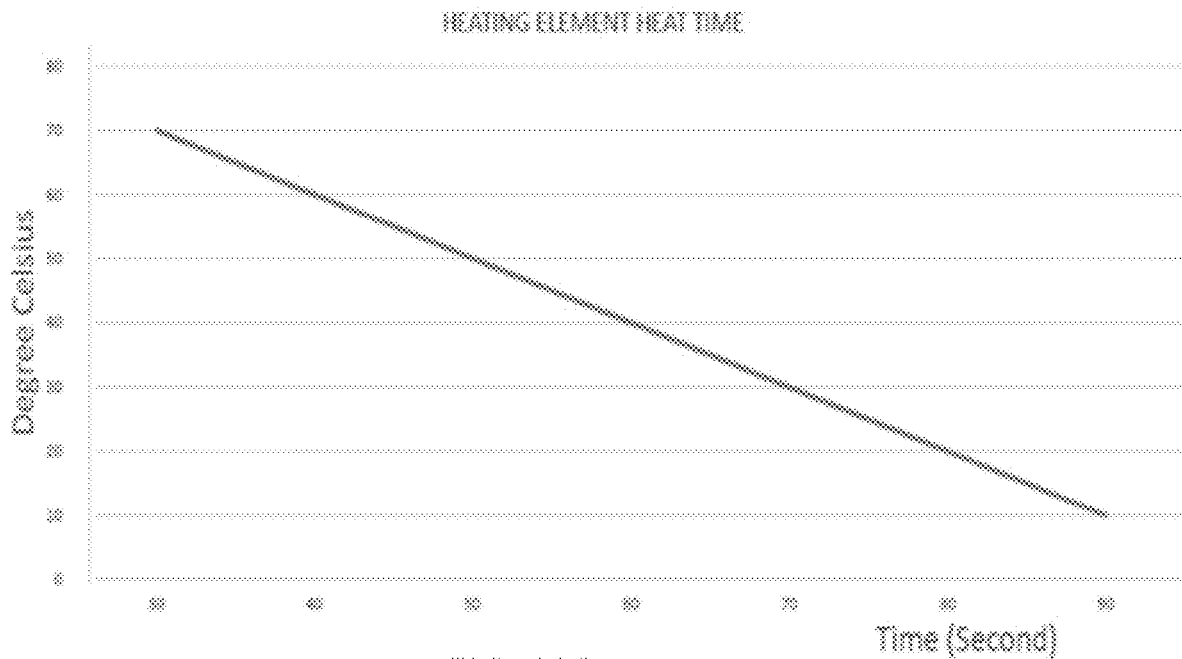
FIGS. 10A and 10B are graphical representations of time to heat a heating element vs. ambient water temperature; and time for a heating element to dissipate residual heat vs. ambient water temperature.

For example, the colder the water temperature surrounding a heating element, the more time it takes the heating element to reach its maximum temperature. This effect is shown in FIG. 10A (for a copper wire heating element). On the other hand, once the current (to the heating element) is turned off, the heating element still contains a residual amount of heat which is dissipated to the surrounding water. The colder the water temperature, the less time it takes to dissipate the residual heat to the surrounding water. This effect of heat dissipation is shown in FIG. 10B.

Figure 10B:
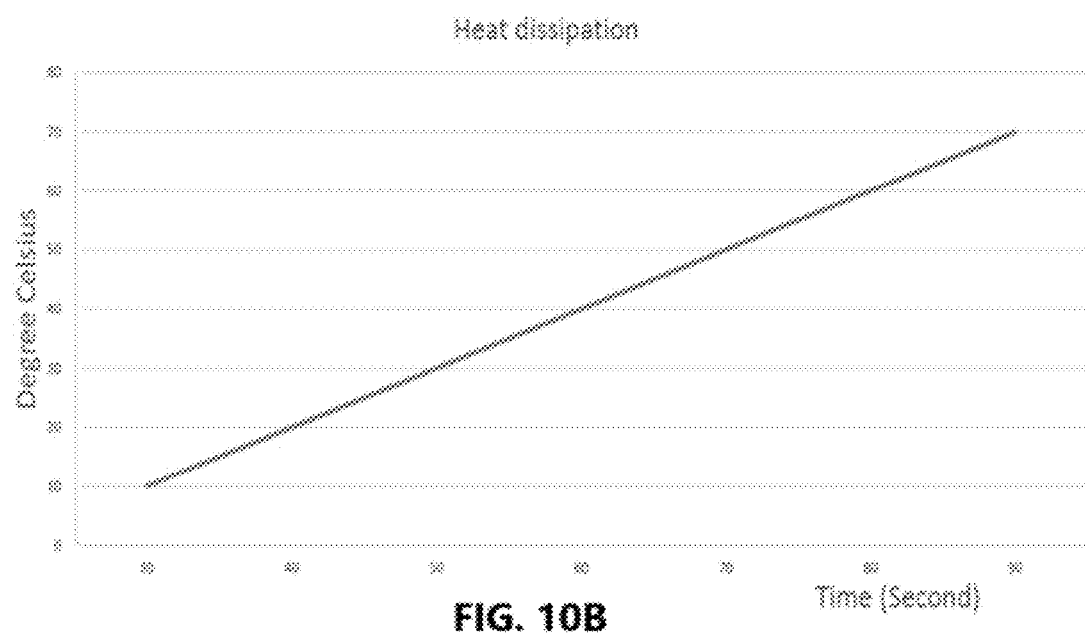

It can be seen from FIGS. 10A and 10B that the higher the water temperature, the less time it takes for the heating element to reach its maximum temperature (FIG. 10A), but the more time it takes for the heating element to dissipate the residual heat to the surround water (FIG. 10B). That is, as the ambient temperature of the water rises, the less time it takes the heating element to reach its maximum temperature, and the more time it takes for the residual heat within the heating element to dissipate.

Figure 11:
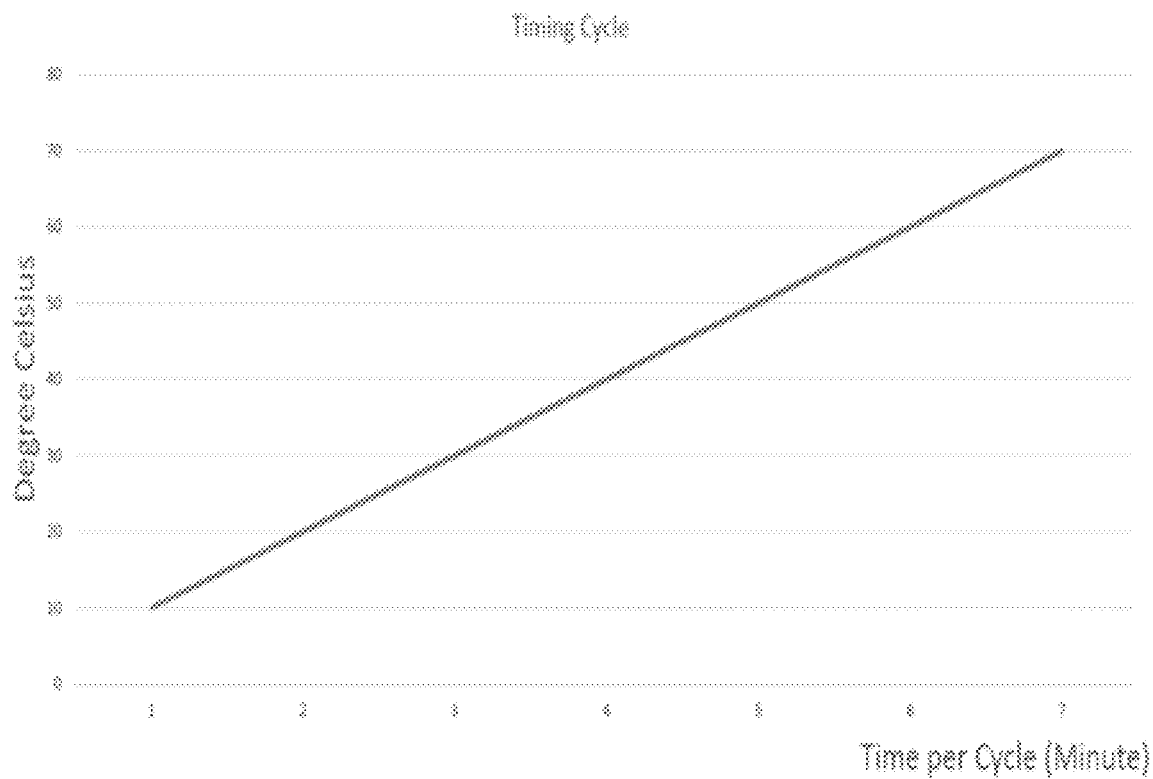
FIG. 11 is a graphical representation of time of a cycle length vs ambient temperature, respectively.

Such an interplay is used to develop an efficient pulsing cycle for each heating element. This is shown in FIG. 11, in which the time for a full cycle (of turning on a heating element, then turning it off to allow residual heat to dissipate) increases with increasing temperature. As the ambient water temperature increases, more time is required for the heating element to dissipate the residual heat—thus increasing the length of the full cycle. Furthermore, as the temperature is increased, the proportion of time required to heat the element to its maximum value decreases in relation to the time required for the heated heating element to dissipate residual heat. Therefore, the heating efficiency of the system increases by: i) increasing the cycle interval with increasing ambient temperature; and ii) decreasing the pulsing interval (within the cycle interval) with increasing temperature.

As an example, suppose the upper heating element is turned on when the upper temperature sensor has a reading of 50° C. As current is passed through the upper heating element, it heats up to its maximum temperature. For example, if a copper heating element is used, it may heat to a maximum of about 400° C. According to FIG. 10A, that should take about 50 seconds. The water is heated by the heating element as it heats up and dissipates heat into the surrounding water. As the current is cut-off, there is still residual heat within the heating element, as its temperature equilibrates with the temperature of the water (which is by now, greater than 50° C.). The heating element continues to heat the water, even though there is no current being applied. According to FIG. 10B, the dissipation will take at least 70 seconds (since the ambient water temperature is greater than 50° C.). That is, the pulsing process takes advantage of using residual heat within the heating element when the current (i.e. power) applied to the heating element is turned off.

The power efficiency $P_E$ of a cycle can be defined as:

$$P_E=(\text{pulse interval})/(\text{cycle interval})$$

For example, a cycle interval may last 10 sec, during which time the heating element is operated for a pulse interval of 7 seconds and turned off for the remaining 3 seconds. That is, the heating element operates at 70% power efficiency.

Therefore, an algorithm can be developed which increases the power efficiency ($P_E$) and cycle interval with the ambient water temperature, thereby heating the water tank in a most efficient manner.

In another exemplary protocol, the power efficiency applied to a given heating element can be adjusted depending on the temperature reading of the temperature sensor associated with that heating element. For example, if the temperature sensor provides a reading that is 15 degrees less than the temperature set-point, the power efficiency ($P_E$) can be set between 70%-90%. As the difference between the temperature set-point and the temperature reading decreases (i.e. as the ambient water temperature increases), the power efficiency ($P_E$) can decrease to 30%-70%, or between 35%-60%, or between 40%-50%, In another exemplary protocol, the cycle interval can be in the range of 7 sec-12 sec, or 8 sec-10 sec, or 10 sec, and can increase with increasing temperature. As discussed above, the power efficiency can be set to between 70%-90% at lower water temperature readings. As the difference between the temperature set-point and the temperature reading decreases (i.e. as the ambient water temperature increases), the power efficiency can decrease to 30%-70%.

The heat-management system can be programmed to use a single pulsing cycle for each heating element within the water tank 120. Or, one set of pulsing cycles can be used for the upper heating element, and another set of pulsing cycles can be used for the lower heating element.

The solid-state relay that is used to modulate the current to the heating elements, can have a zero-point synchronization so that harmonics are not created in the electrical network.

Vibration of Heating Elements

In another exemplary embodiment, the transfer of residual heat may be efficiently achieved by use of vibration in addition to pulsing of each heating element.

As an example, a radio-frequency (RF) transmitter may be attached to one or both heating elements, thereby rendering the one or more heating elements as an antenna inside the water tank that vibrate upon application of radio frequencies.

Figure 12:
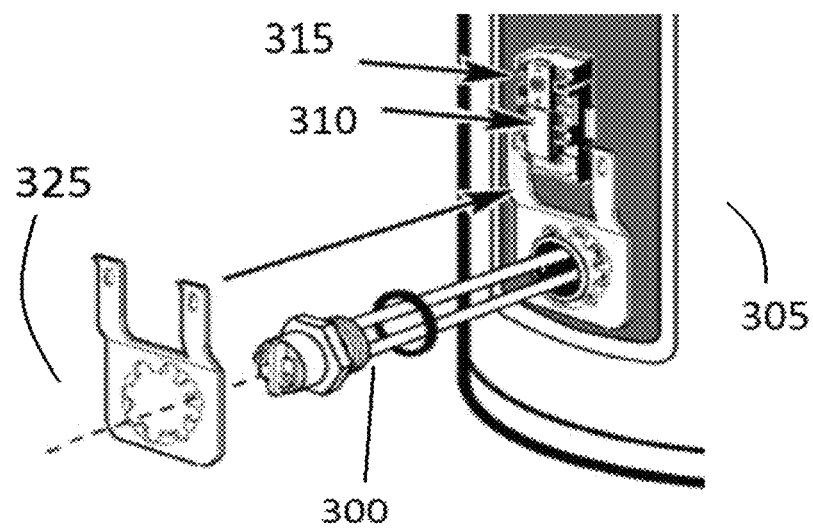
FIG. 12 illustrates a cut-away portion of a water tank in which a heating element may be inserted.

FIG. 12 illustrates a cut-away portion of a water tank (305), in which a heating element (300) may be inserted. A temperature sensor (310) associated with the heating element (300) is also shown, as is a reset mechanism (315). The heating element (300) may have two prongs (further detailed in FIG. 13) and may be stabilized by use of a mounting bracket (325).

Figure 13:
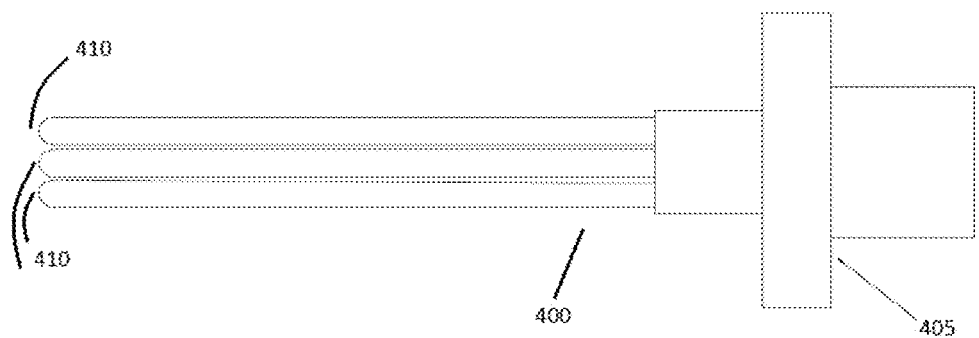
FIG. 13 illustrates a plan view of an embodiment of a heating element with an RF transmitter that may be used in the heating system.

FIG. 13 illustrates a plan view of an embodiment of a heating element with an RF transmitter that may be used in the heating system. The heating element (400) includes an RF transmitter (405). While the element (400) shown has 3 prongs (410) in FIG. 12, it is understood that the heating element may have fewer (for example 1 or 2) or more (4, 5, etc.).

While not being bound to any theory, it is contemplated that such a vibration can excite water molecules to collectively absorb more energy than mere pulsing. Since each antenna (i.e. vibrating heating element) is inside a metal tank, a wave form can resonate as an echo within the tank, thereby increasing the power of the wave. Theoretical considerations suggest that power absorbed by water molecules is maximized at a frequency of about 22 GHz. Consequently, heat transfer from the heating elements to water within the tank is increased.

Figure 14:
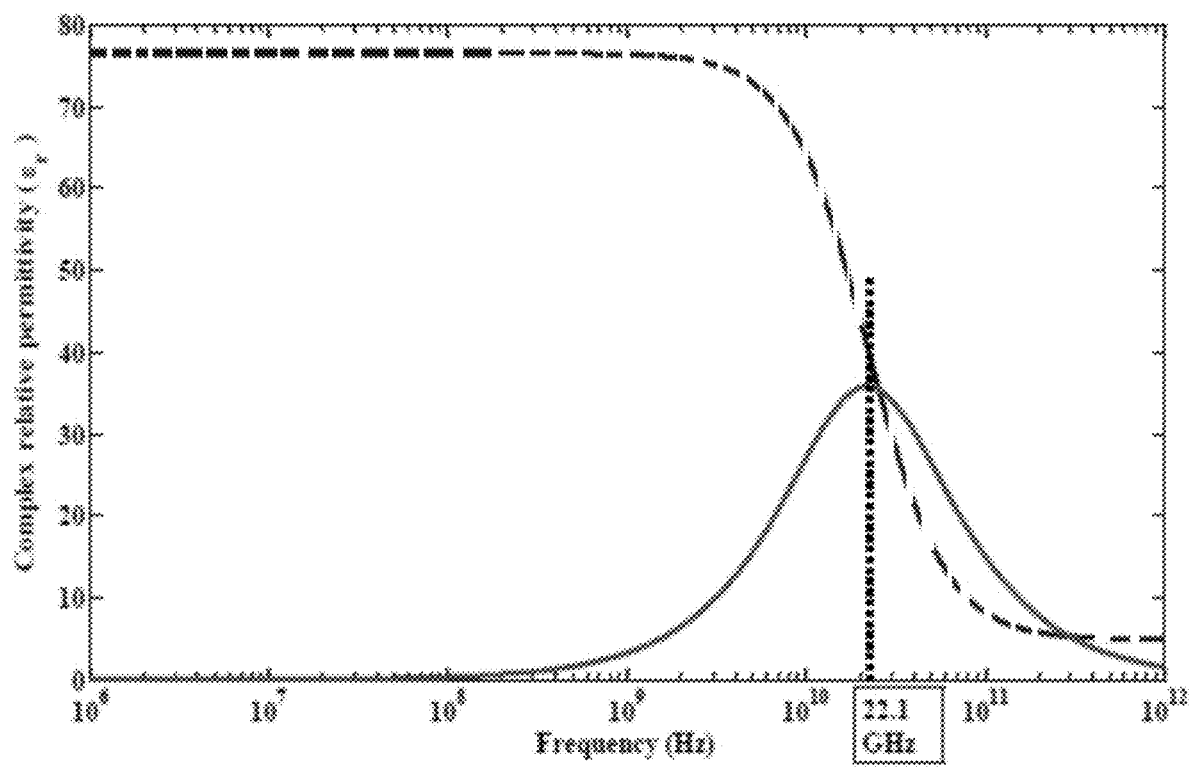
FIG. 14 illustrates the real part and imaginary part of the complex permittivity of water at 30° C.

FIG. 14 illustrates the real part (dotted line) and imaginary part (solid line) of the complex permittivity of water at 30° C. As shown, significant dispersion in the dielectric properties occurs in a frequency range from 2 GHz to 200 GHz. Around 22 GHz, the imaginary part of the permittivity peaks and this frequency corresponds to the frequency where the most power is dissipated in the water.

Experimentally, each heating element can vibrate in a range of from about 15 GHz to 30 GHz, or each can vibrate at about 15 GHz or 30 GHz.

In summary, while a pulsing cycle is applied to a heating element, the heating element may also act as an antenna inside the water tank when an RF transmitter is attached. The RF transmitter imparts a frequency of vibration to the heating element, which in turn, may excite/vibrate water molecules to be able to absorb more energy at a faster rate (than without excitation/vibration). An antenna within a metal tank may generate a good wave form that can resonate as an echo inside the tank—thereby increasing the power of the wave. Consequently, the residual heat transfer from the heating element to the water may be increased.

Embodiments Five Through Eight

In each of the four embodiments described above, each heating element can be equipped with an RF transmitter and made to vibrate via the control box. This results in four additional embodiments, shown in FIGS. 15-22, each of which retain the same reference numbers for common elements shown in FIGS. 1B and 2-9. It should be understood that while vibration of two heating elements are incorporated in each of the embodiments shown in FIGS. 15-22, the heat management system can also incorporate vibration of only one heating element (i.e. either the upper or the lower heating element in the water tank).

Figure 15:
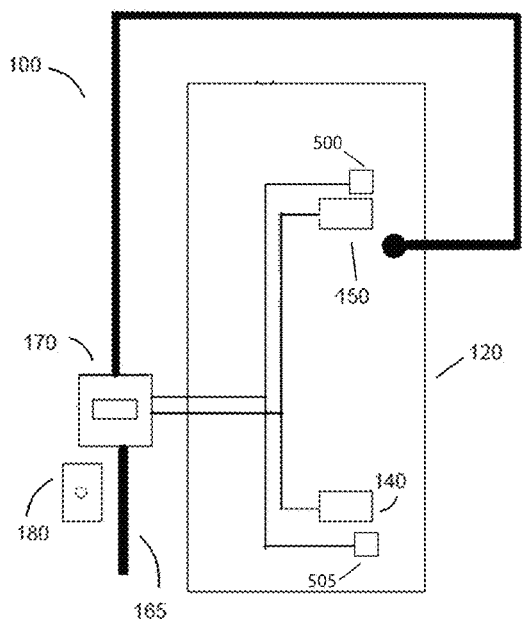
FIG. 15 illustrates a fifth embodiment of the water heating system.

FIG. 15 shows a fifth embodiment of the heat management system 100 which incorporates vibrating heating elements in the water tank (by attaching an RF transmitter to each heating element, as shown, for example, in FIG. 12), as opposed to the embodiment shown in FIGS. 1B and 2. The control box 170 also communicates with two RF transmitters (500, 505), each of which is attached to a respective heating element (not shown). The RF transmitters (500, 505) are external to the tank 120.

Figure 16:
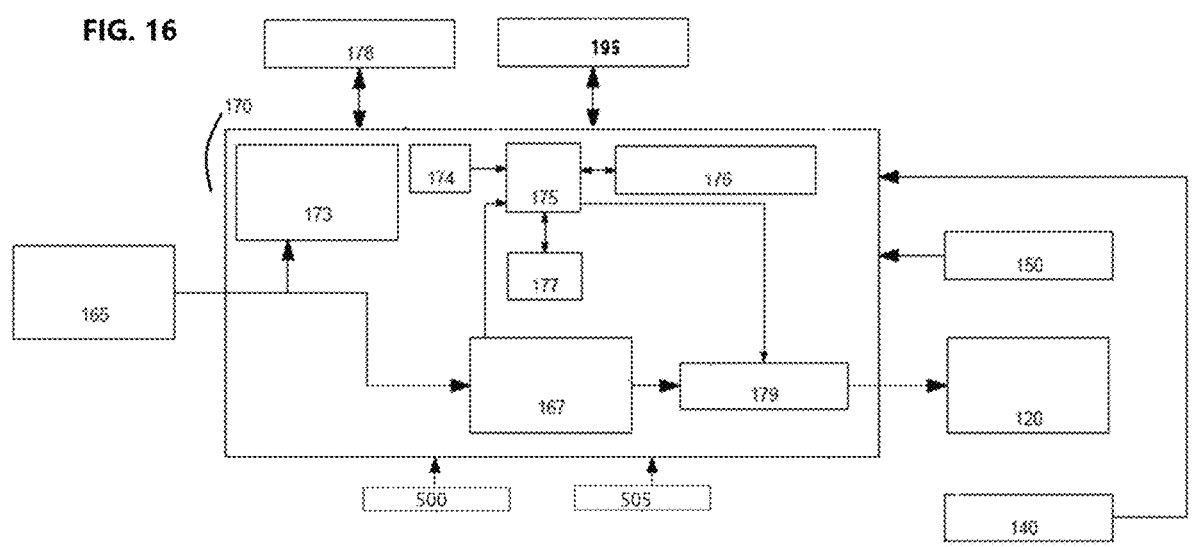
FIG. 16 illustrates a schematic representation of a control box in relation to the fifth embodiment.

FIG. 16 provides a schematic representation of the embodiment of the heat management system shown in FIG. 15. The components of the heat management system shown in FIG. 16 are identical to those shown in FIG. 2, and thus retain the original reference numbers. In addition, control box 170 is connected to the RF frequency transmitters (500, 505).

Figure 17:
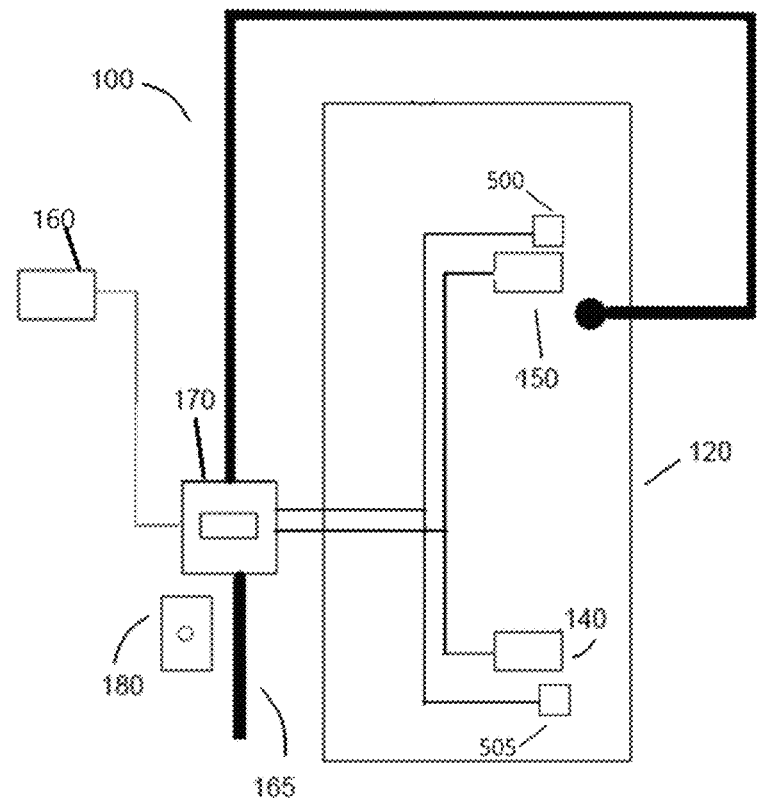
FIG. 17 illustrates a sixth embodiment of the water heating system.

FIG. 17 shows a sixth embodiment of the heat management system 100 which incorporates vibrating heating elements in the water tank (by attaching an RF transmitter to each heating element, as shown, for example, in FIG. 12, as opposed to the embodiment shown in FIGS. 3 and 4 (which includes a third temperature sensor 160 located outdoors to measure the ambient outdoor temperature). The control box 170 also communicates with two RF transmitters (500, 505), each of which is attached to a respective heating element (not shown). The RF transmitters (500, 505) are external to the tank 120.

Figure 18:
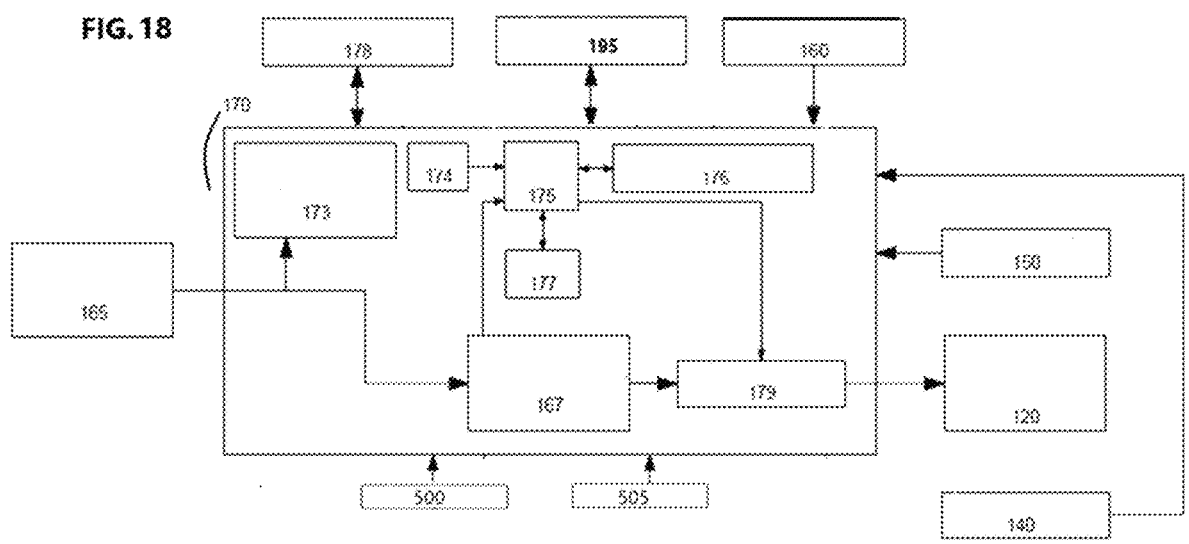
FIG. 18 illustrates a schematic representation of a control box in relation to the sixth embodiment.

FIG. 18 provides a schematic representation of the embodiment of the heat management system shown in FIG. 17. The components of the heat management system shown in FIG. 18 are identical to those shown in FIG. 2, and thus retain the original reference numbers. In addition, control box 170 is connected to the RF frequency transmitters (500, 505).

Figure 19:
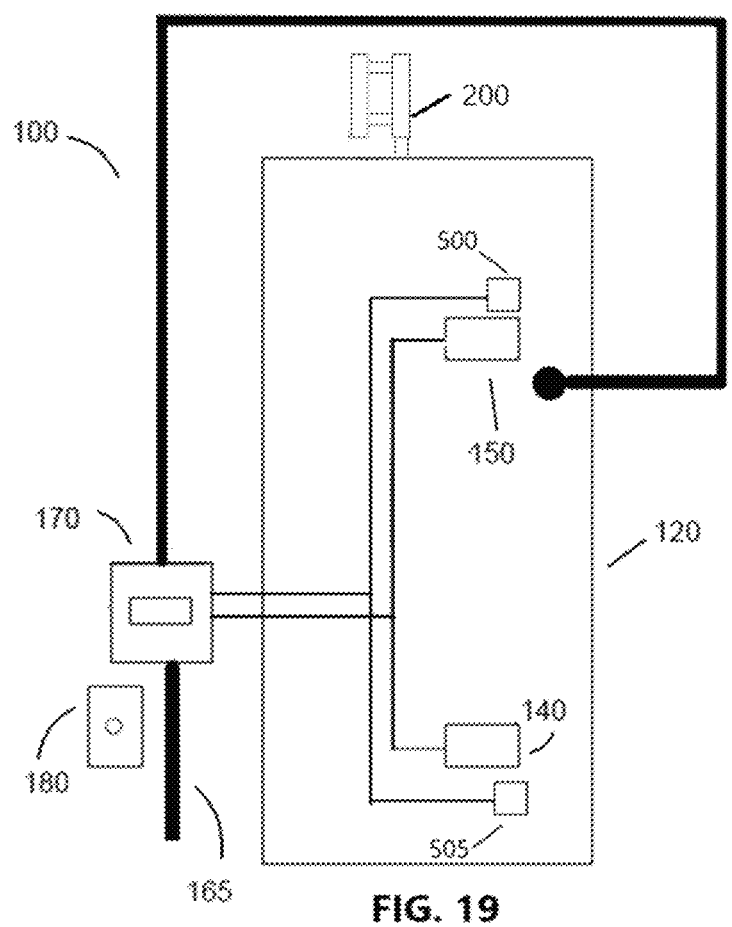
FIG. 19 illustrates a seventh embodiment of the water heating system.

FIG. 19 shows a seventh embodiment of the heat management system 100 which incorporates vibrating heating elements in the water tank (by attaching an RF transmitter to each heating element, as shown, for example, in FIG. 12, as opposed to the embodiment shown in FIGS. 6 and 7 (which includes a UV disinfection unit 200). The control box 170 also communicates with two RF transmitters (500, 505), each of which is attached to a respective heating element (not shown). The RF transmitters (500, 505) are external to the tank 120.

Figure 20:
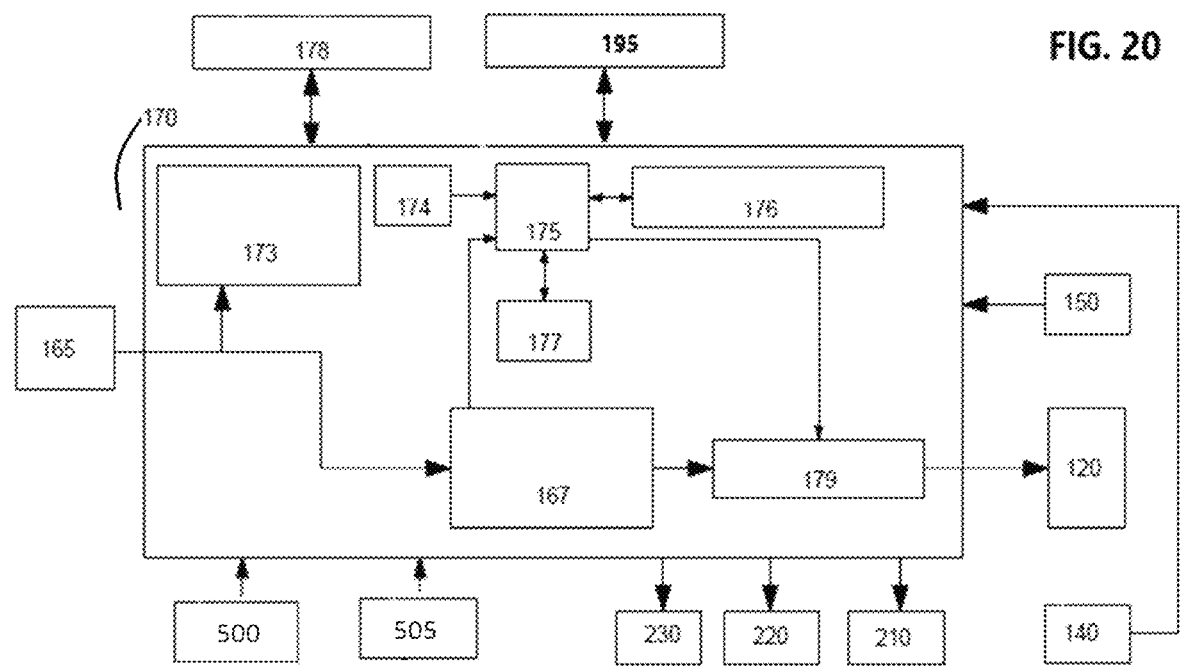
FIG. 20 illustrates a schematic representation of a control box in relation to the seventh embodiment.

FIG. 20 provides a schematic representation of the embodiment of the heat management system shown in FIG. 19. The components of the heat management system shown in FIG. 20 are identical to those shown in FIG. 7, and thus retain the original reference numbers. In addition, control box 170 is connected to the RF frequency transmitters (500, 505).

Figure 21:
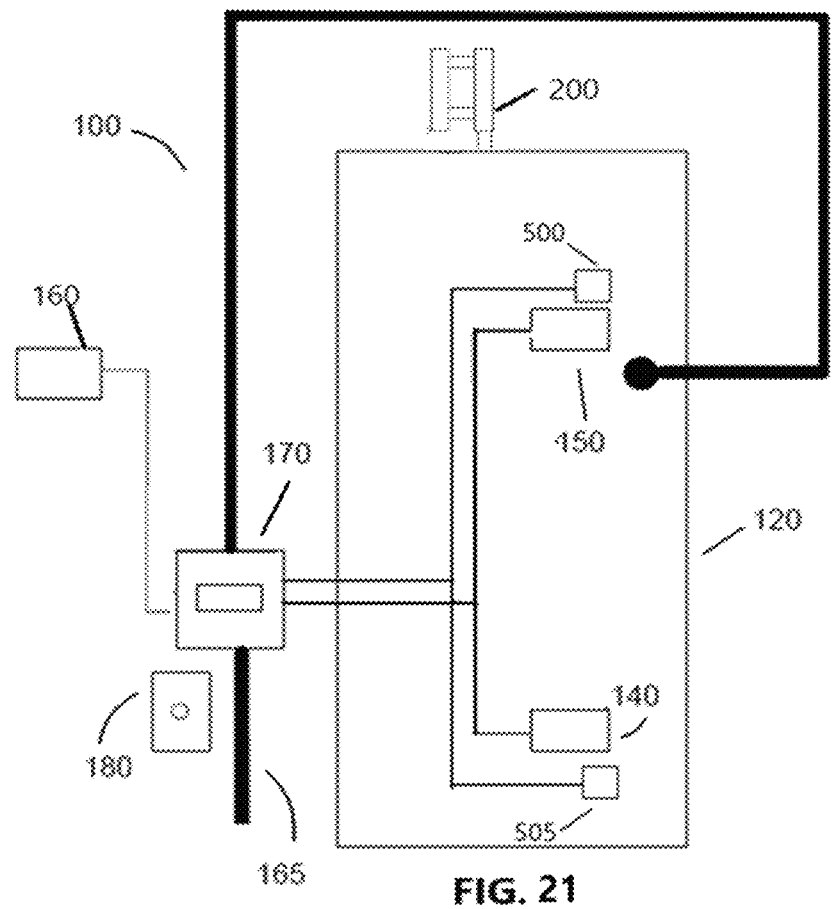
FIG. 21 illustrates am eighth embodiment of the water heating system.

FIG. 21 shows an eighth embodiment of the heat management system 100 which incorporates vibrating heating elements in the water tank (by attaching an RF transmitter to each heating element, as shown, for example, in FIG. 12, as opposed to the embodiment shown in FIGS. 8 and 9 (which includes both an external temperature sensor 160 and a UV disinfection unit 200). The control box 170 also communicates with two RF transmitters (500, 505), each of which is attached to a respective heating element (not shown). The RF transmitters (500, 505) are external to the tank 120.

Figure 22:
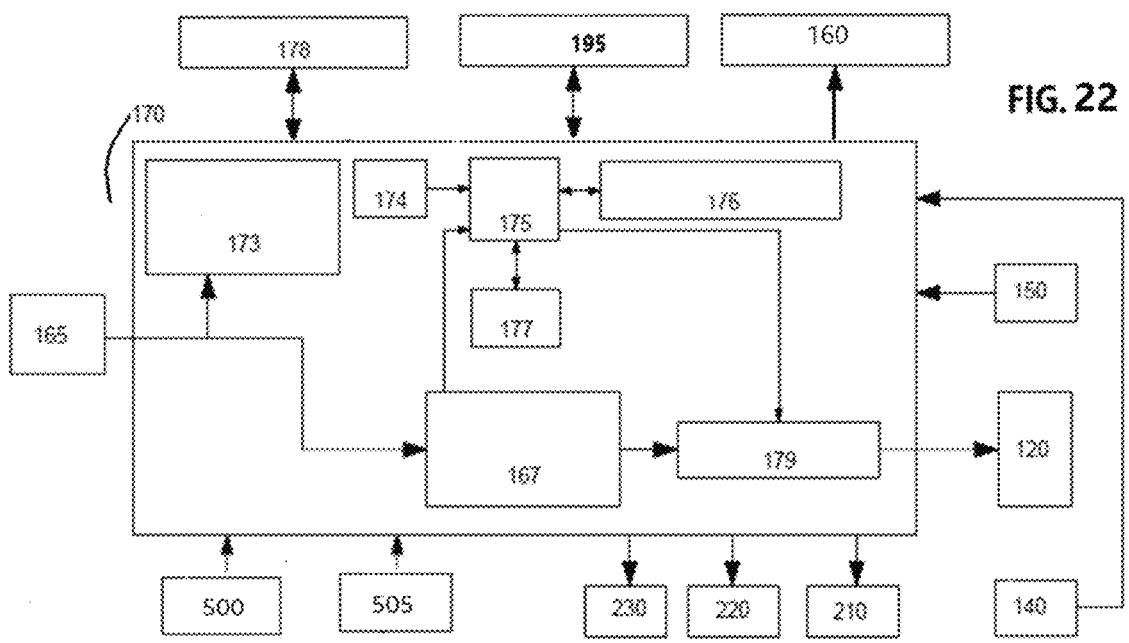
FIG. 22 illustrates a schematic representation of a control box in relation to the eighth embodiment.

FIG. 22 provides a schematic representation of the embodiment of the heat management system shown in FIG. 21. The components of the heat management system shown in FIG. 22 are identical to those shown in FIG. 9, and thus retain the original reference numbers. In addition, control box 170 is connected to the RF frequency transmitters (500, 505).

Disinfection Protocols

Public health regulations require that water in the water tank 120 should be free of harmful bacteria. As such, the heat management system comprises a disinfection regimen for disinfecting the water of harmful bacteria, as required by local regulations. The regimen may comprise disinfection, for example, by heat or by UV light.

For example, most public regulations require that the temperature of the water within the water tank 120 should be above 60° C. for one hour within 24 hours for kill the bacteria in the tank. The microcontroller is programmed to read a history of water temperatures of tank. If the temperature of each of the upper and lower parts of the water tank 120 have been maintained at, or above, 60° C. for at least one hour within a 24 hour-period, then the disinfection regimen will not be required. If, on the other hand, temperature readings indicate that either of the lower or upper temperature sensors has dipped below 60° C. for at least one hour within a 24 hour-period, a disinfection regimen is applied. For example, the regimen can comprise heating the requisite heating elements at 100% power until 60° C. is attained and maintained for one hour. This can occur, for example, between midnight and 2 AM, when the water tank 120 is not in use.

Alternatively, disinfection may also be carried out using UV light. This may be achieved by using a UV disinfection unit, as described above.

Heat-Management Protocols

Discussed below are examples of heat-management protocols that can be applied by the heat-management system. While a number of scenarios are described, protocols required by the utility company during certain conditions override all other protocols.

For example, if the ambient outdoor temperature is below a first critical temperature, or above a second critical temperature, then the utility-mandated heat-management protocol will apply.

If the ambient outdoor temperature is within the first and second critical temperatures, then the control box can execute an external command from either the user or the utility company (which has precedence over the user). Alternatively, if there is no external command, then a standard pre-programmed protocol can be used.

Protocol when Ambient Outdoor Temperature is Outside a Critical Range

In cold climates, the ambient outdoor temperature can drop to sub-freezing temperatures, during which time there is a high demand for power to heat homes. In order to lessen the load, a utility company can command a protocol to reduce power consumption of water heaters.

For example, if the ambient outdoor temperature is less than −12° Celsius, the utility company can set the power efficiency to, for example, between 0%-50%, or 10%-40%, or 20%-30%, or 25%.

Where an embodiment of the heat-management system does not have a third temperature sensor for measuring the ambient outdoor temperature, the utility company can send a command, via the external communication module, to the control box, to set the power efficiency accordingly.

Alternatively, if the heat-management system does have a third temperature sensor for measuring the ambient outdoor temperature (e.g. the second or fourth embodiment described above), the control box can be pre-programmed to execute a power efficiency protocol as set by the utility company. The utility company can set the power efficiency to, for example, between 0%-50%, or 10%-40%, or 20%-30%, or 25%.

In either case (i.e. with or without the third temperature sensor), the remote indicator 180 will indicate to the user that a protocol is in effect.

Utility Company Algorithm During Peak Hours

When a utility company plans to reduce the electrical load during peak hours of energy consumption, a command can be sent from the utility provider to the control box through the external communication module and saved into the memory of the control box. The microcontroller will check the command in memory during peak time and will program the modulation power efficiency of each heating element accordingly. The utility can send a new command during peak hours, which will be executed by the microcontroller in real time.

End User Algorithm

An end user can program a heating protocol depending on his/her personal schedule. For example, a command to reduce or shut down water heating during times of minimal use (e.g. vacation, a weekend get-away, etc.) can be conveyed via the user interface or through the external communication module (for example, through a mobile application).

Or, an end user can send a command to heat the water, using pulse modulation, in advance of when hot water will be needed. For example, if hot water is required for 8 AM, the heat-management system will check the temperature of the tank and calculate the needed heating time for a given power efficiency. A full hot water tank will be ready for the scheduled time. Therefore, there is no need to maintain hot water all the time.

Economical Plan Algorithm

This protocol can provide economical operation of the hot water tank by providing different algorithms during on-peak and off-peak periods. The real time clock in the control box ascertains the time of day and whether it is off-peak or on-peak time, according to customized settings.

For example, the on-peak time can be divided into two periods: 6 AM-9 AM (period 1) and 4 PM-8 PM (period 2). During period 1, for example, if the temperature of the tank is above 50° C., the power efficiency is set to 0% (i.e. no power is sent to the heating elements). If the temperature of either temperature sensor is less than 50° C., the power efficiency can be set to, for example, 25% to attain and maintain the water temperature at 50° C. Similarly, during period 2, the power efficiency can be set to, for example, 35% to attain and maintain the water temperature at 50° C. The power efficiencies can be changed anytime by the utility company.

During off-peak hours, the control box can be programmed to provide a power efficiency of, for example, 60%-90%, or 70%-80%, or 75%. Alternatively, the user may decide to operate the system at power efficiency of their choosing.

Standard Protocol

When there no external protocol communicated by a utility company, the user may develop a customized protocol or choose to use an economical plan (as described above). Alternatively, the user may choose to go with a standard protocol, in which the control box, using the solid-state relay, is configured to operate continuously. In this case, the water tank heater operates like a traditional water tank.

Figure 23:
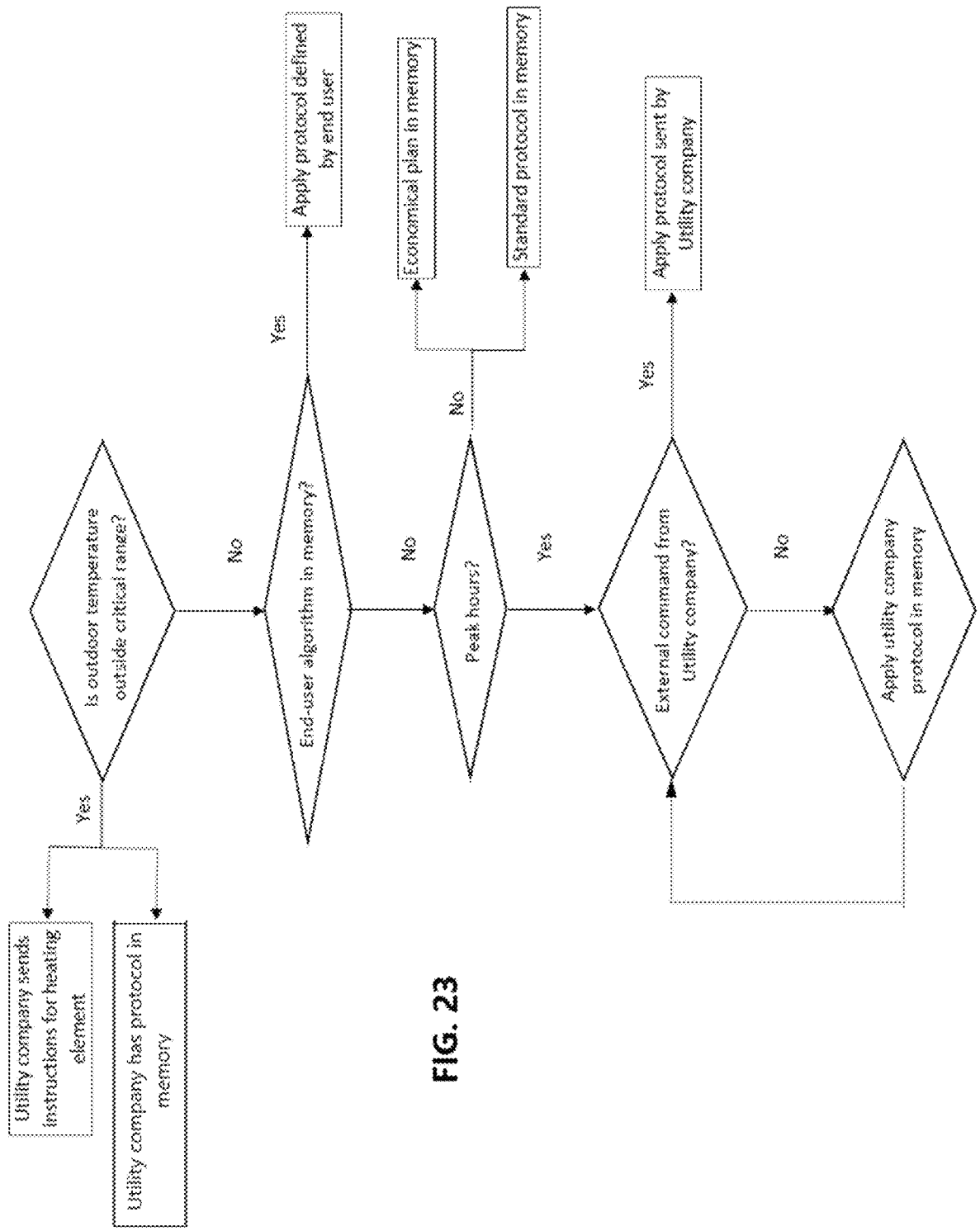
FIG. 23 illustrates a flow chart of an algorithm program for the water heating system.

As an example, FIG. 23 illustrates a flow chart of an algorithm program for the water heating system that incorporates one or more of the protocols described above Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While particular implementations and applications of the present disclosure have been illustrated and described, it is to be understood that the present disclosure is not limited to the precise construction disclosed herein and that various modifications, changes, and variations can be apparent from the foregoing descriptions without departing from the spirit and scope of an invention as defined in the appended claims.

The invention claimed is:

1. A heating management system for a hot-water tank, the system comprising:
   a first temperature sensor for measuring a first temperature of water in a first portion of the tank;
   a second temperature sensor for measuring a second temperature of the water in a second portion of the tank;
   a controller comprising a processor, a solid state relay and a computer readable memory storing instructions that, when executed by the processor, cause the controller to:
   a) compare the first temperature to a first set point;
   b) when the first temperature is less than the first set point, control current to a first heating element in the first portion of the tank to operate the first heating element in a first series of pulsed cycles, until the first temperature attains the first set point;
   c) after the first temperature attains the first set point, compare the second temperature to a second set point;
   d) when the second temperature is less than the second set point, control current to a second heating element in the second portion of the tank to operate the second heating element in a second series of pulsed cycles, until the second temperature attains the second set point; and
   e) maintain the first and second temperatures at the respective set points by controlling current to the respective heating elements such that the first and second heating elements operate sequentially in pulsed cycles;
   wherein:
   each pulsed cycle consists of a pulse interval and a cycle interval, the pulse interval defined as a first interval of time during which the controller sends current to the heating element to heat the heating element to a maximal temperature, and the cycle interval defined as a sum of the pulse interval and a second interval of time during which the controller does not send current to the heating element and the heating element dissipates residual heat to the water; and
   the controller decreases the pulse interval and increases the cycle interval of each pulsed cycle with increasing water temperature.

2. The system of claim 1 further comprising a radio frequency transmitter, wherein the radio frequency transmitter is attached to either the first or second heating element.

3. The system of claim 1 further comprising a first and second radio frequency transmitter, wherein the first radio frequency transmitter is attached to the first heating element; and the second radio frequency transmitter is attached to the second heating element.

4. The system of claim 3, wherein at least one of the first and second heating elements vibrates at a frequency of between 15 GHz and 30 GHz.

5. The system of claim 1, wherein a power efficiency (PE) of each pulsed cycle, defined as PE=(pulse interval)/(cycle interval), decreases with increasing water temperature and is between 20%-90%.

6. The system of claim 5, wherein:
when a difference between the first temperature and the first set temperature is greater than 15° C., the power efficiency of the first series of pulsed cycles is between 70%-90%; and
when a difference between the second temperature and the second set temperature is greater than 15° C., the power efficiency of the second series of pulsed cycles is between 70%-90%.

7. The system of claim 5, wherein:
when a difference between the first temperature and the first set temperature is less than 15° C., the power efficiency of the first series of pulsed cycles is between 20%-70%; and
when a difference between the second temperature and the second set temperature is less than 15° C., the power efficiency of the second series of pulsed cycles is between 20%-70%.

8. The system of claim 1, wherein the first cycle interval is between 7 sec-13 sec; and the second cycle interval is between 7 sec-13 sec.

9. The system of claim 1, further comprising a third temperature sensor for measuring an ambient outdoor temperature which is communicated to the controller, wherein the instructions stored on the memory, when executed by the processor, cause the controller to shut off each heating element when the outdoor ambient temperature is outside a critical temperature range.

10. The system of claim 1, further comprising a communication module operable to communicate with an external controller remote from the water heater, wherein the instructions stored on the memory, when executed by the processor, cause the controller to receive a command for operation of the first and second heating elements from the external controller when an outdoor ambient temperature is outside a critical temperature range.

11. The system of claim 9, wherein the critical temperature range is between about minus 15° C. and about +27° C.

12. The system of claim 10, wherein the critical temperature range is between about minus 15° C. and about +27° C.

13. The system of claim 1, further comprising a UV sanitization unit that comprises:
a pump external to the tank;
a first tube through which water is pumped out of the tank the external tank;
a UV portion through which the pumped water passes and is disinfected; and
a second tube through which the disinfected water is returned to the tank.

14. A heating management system for a hot-water tank, the system comprising:
a first temperature sensor for measuring a first temperature of water in a first portion of the tank;
a second temperature sensor for measuring a second temperature of the water in a second portion of the tank;
a radio frequency transmitter, wherein the radio frequency transmitter is attached to either the first or second heating element;
a UV sanitization unit;
a third temperature sensor for measuring an ambient outdoor temperature; and
a controller comprising a processor, a solid state relay and a computer readable memory storing instructions that, when executed by the processor, cause the controller to:
shut off each heating element when the outdoor ambient temperature is outside a critical temperature range; and
when the outdoor ambient temperature is within the critical temperature range;
a) compare the first temperature to a first set point;
b) when the first temperature is less than the first set point, control current to a first heating element in the first portion of the tank to operate the first heating element in a first series of pulsed cycles, until the first temperature attains the first set point;
c) after the first temperature attains the first set point, compare the second temperature to a second set point;
d) when the second temperature is less than the second set point, control current to a second heating element in the second portion of the tank to operate the second heating element in a second series of pulsed cycles, until the second temperature attains the second set point; and
e) maintain the first and second temperatures at the respective set points by controlling current to the respective heating elements such that the first and second heating elements operate sequentially in pulsed cycles;
wherein:
each pulsed cycle consists of a pulse interval and a cycle interval, the pulse interval defined as a first interval of time during which the controller sends current to the heating element to heat the heating element to a maximal temperature, and the cycle interval defined as a sum of the pulse interval and a second interval of time during which the controller does not send current to the heating element and the heating element dissipates residual heat to the water;
the controller decreases the pulse interval and increases the cycle interval of each pulsed cycle with increasing water temperature; and
the critical temperature range is between about minus 15° C. and about +27° C.

15. The system of claim 14 further comprising a first and second radio frequency transmitter, wherein the first radio frequency transmitter is attached to the first heating element; and the second radio frequency transmitter is attached to the second heating element.

16. The system of claim 14, wherein at least one of the first and second heating elements vibrates at a frequency of between 15 GHz and 30 GHz.

17. The system of claim 14, wherein the UV sanitization unit comprises:
a pump external to the tank;
a first tube through which water is pumped out of the tank the external tank;
a UV portion through which the pumped water passes and is disinfected; and
a second tube through which the disinfected water is returned to the tank.

18. The system of claim 14, wherein a power efficiency (PE) of each pulsed cycle, defined as PE=(pulse interval)/(cycle interval), decreases with increasing water temperature and is between 20%-90%.

19. The system of claim 18, wherein:
when a difference between the first temperature and the first set temperature is greater than 15° C., the power efficiency of the first series of pulsed cycles is between 70%-90%;
when a difference between the second temperature and the second set temperature is greater than 15° C., the power efficiency of the second series of pulsed cycles is between 70%-90%.

20. The system of claim 18, wherein:
when a difference between the first temperature and the first set temperature is less than 15° C., the power efficiency of the first series of pulsed cycles is between 20%-70%; and
when a difference between the second temperature and the second set temperature is less than 15° C., the power efficiency of the second series of pulsed cycles is between 20%-70%.

* * * * *